US011973563B2

(12) United States Patent
Svendsen et al.

(10) Patent No.: US 11,973,563 B2
(45) Date of Patent: Apr. 30, 2024

(54) APPARATUS, METHOD AND COMPUTER PROGRAM FOR DETERMINING BEAMFORMING DIRECTION

(71) Applicant: NOKIA SOLUTIONS AND NETWORKS OY, Espoo (FI)

(72) Inventors: Simon Svendsen, Aalborg (DK); Oana-Elena Barbu, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/636,389

(22) PCT Filed: Aug. 21, 2019

(86) PCT No.: PCT/EP2019/072394
§ 371 (c)(1),
(2) Date: Feb. 18, 2022

(87) PCT Pub. No.: WO2021/032300
PCT Pub. Date: Feb. 25, 2021

(65) Prior Publication Data
US 2022/0286189 A1    Sep. 8, 2022

(51) Int. Cl.
*H04B 7/08*    (2006.01)
(52) U.S. Cl.
CPC ................... *H04B 7/086* (2013.01)
(58) Field of Classification Search
CPC ..................................... H04B 7/086
See application file for complete search history.

(56) References Cited

U.S. PATENT DOCUMENTS

| | | | | |
|---|---|---|---|---|
| 2018/0176948 | A1* | 6/2018 | Islam | H04W 74/0833 |
| 2020/0059898 | A1* | 2/2020 | Osawa | H04B 7/0404 |
| 2020/0119800 | A1* | 4/2020 | Rune | H04W 72/046 |
| 2020/0267571 | A1* | 8/2020 | Park | H04L 5/0051 |
| 2022/0286189 | A1* | 9/2022 | Svendsen | H04B 7/086 |
| 2023/0057894 | A1* | 2/2023 | Shunnarah | G01J 3/4412 |

FOREIGN PATENT DOCUMENTS

KR    2018 0036602 A    4/2018

OTHER PUBLICATIONS

Office Action dated Jun. 30, 2022, corresponding to Indian Patent Application 202217008106.
International Search Report and Written Opinion dated Apr. 2, 2020 corresponding to International Patent Application No. PCT/EP2019/072394.

* cited by examiner

*Primary Examiner* — Jaison Joseph
(74) *Attorney, Agent, or Firm* — SQUIRE PATTON BOGGS (US) LLP

(57) ABSTRACT

There is provided an apparatus, said apparatus comprising means for receiving at least one signal from at least one transmitter; determining at least one parameter of the at least one signal; determining, based on the at least one parameter, which of a plurality of stored differential signal reception radiation patterns the received signal corresponds to, each of the plurality of stored radiation patterns associated with a direction of arrival; and aligning an antenna beam to the transmitter based on the direction of arrival associated with the determined stored differential signal reception radiation pattern.

33 Claims, 24 Drawing Sheets

APPARATUS, METHOD AND COMPUTER PROGRAM FOR DETERMINING BEAMFORMING DIRECTION

FIELD

The present application relates to a method, apparatus, system and computer program and in particular but not exclusively to instantaneous beam alignment and management based on differential signal reception resubmit.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided an apparatus comprising means for performing: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

According to an example of the first aspect, the at least one signal is a reference signal.

According to the above example, the reference signal comprises one of a synchronisation signal block, a demodulation reference signal, a channel state information reference signal, a specific beam alignment reference signal and a sounding reference signal.

According to any of the examples of the first aspect, the transmitter comprises one of a base station and a user equipment and the apparatus comprises the other of the base station and the user equipment.

According to the above example, the apparatus comprises a user equipment and the means are further configured to perform receiving one or more synchronization signal block sweeps from the base station, and select the synchronization signal block sweep with the best reference signal received power for time synchronization using a primary synchronization signal and a secondary synchronization signal, which are part of the synchronization signal block.

According to the above example, the means are further configured to perform decoding of master block information to obtain burst sequence information of the one or more synchronization signal block sweeps.

According to the above example, the means are further configured to perform using decoded master block information to determine when the base station will next be configured with the synchronization signal block sweep with the best reference signal received power, and time transmission of the user equipment accordingly.

According to any of the examples of the first aspect, the means are further configured to perform determining an identity of the transmitter.

According to any of the examples of the first aspect the means are further configured to perform determining that the power of the at least one signal is higher than a threshold value.

According to any of the examples of the first aspect the means are further configured to perform determining a parameter of the at least one signal by comparing at least one of a power and a phase of a first reception of the signal with the at least one of a power and a phase of a second reception of the signal.

According to the above example the first reception of the signal is received at at least one first antenna radiation pattern and the second reception of the signal is received at at least one second antenna radiation pattern.

According to any of the examples of the first aspect the means are further configured to perform changing the differential signal reception pattern to obtain a more accurate direction of arrival.

According to the above example the means are further configured to perform changing the differential signal reception pattern by changing power and phase weights of an antenna of the apparatus.

According to any of the examples of the first aspect the means are further configured to perform monitoring the determined differential signal reception radiation pattern after a first time period, and changing the determined differential signal reception pattern when a quality threshold is not met.

According to any of the examples of the first aspect the means are further configured to perform at least one of digital, hybrid and analog beam steering.

According to any of the examples of the first aspect each of the plurality of stored radiation patterns is associated with a respective direction of arrival.

According to any of the examples of the first aspect the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: receive at least one signal from at least one transmitter; determine at least one parameter of the at least one signal; determine, based on the at least one parameter, which of a plurality of stored differential signal reception radiation patterns the received signal corresponds to, the plurality of stored radiation patterns associated with a direction of arrival; and align an antenna beam to the transmitter based on the direction of arrival associated with the determined stored differential signal reception radiation pattern.

According to an example of the second aspect, the at least one signal is a reference signal.

According to the above example, the reference signal comprises one of a synchronisation signal block, a demodulation reference signal, a channel state information reference signal, a specific beam alignment reference signal and a sounding reference signal.

According to any of the examples of the second aspect, the transmitter comprises one of a base station and a user equipment and the apparatus comprises the other of the base station and the user equipment.

According to the above example, the apparatus comprises a user equipment and the at least one memory and the computer program code are configured to, with the at least one processor, cause the apparatus at least to perform receiving one or more synchronization signal block sweeps from the base station, and select the synchronization signal block sweep with the best reference signal received power for time synchronization using a primary synchronization signal and a secondary synchronization signal, which are part of the synchronization signal block.

According to the above example, the at least one memory and the computer program code are configured to, with the at least one processor, cause the apparatus at least to perform decoding of master block information to obtain burst sequence information of the one or more synchronization signal block sweeps.

According to the above aspect, the at least one memory and the computer program code are configured to, with the at least one processor, cause the apparatus at least to perform using decoded master block information to determine when the base station will next be configured with the synchronization signal block sweep with the best reference signal received power, and time transmission of the user equipment accordingly.

According to any of the examples of the second aspect, the at least one memory and the computer program code are configured to, with the at least one processor, cause the apparatus at least to determine an identity of the transmitter.

According to any of the examples of the second aspect, the at least one memory and the computer program code are configured to, with the at least one processor, cause the apparatus at least to determine that the power of the at least one signal is higher than a threshold value.

According to any of the examples of the second aspect, the at least one memory and the computer program code are configured to, with the at least one processor, cause the apparatus at least to determine a parameter of the at least one signal by comparing at least one of a power and a phase of a first reception of the signal with the at least one of a power and a phase of a second reception of the signal.

According to the above example the first reception of the signal is received at at least one first antenna radiation pattern and the second reception of the signal is received at at least one second antenna radiation pattern.

According to any of the examples of the second aspect, the at least one memory and the computer program code are configured to, with the at least one processor, cause the apparatus at least to change the differential signal reception pattern to obtain a more accurate direction of arrival.

According to the above example, the at least one memory and the computer program code are configured to, with the at least one processor, cause the apparatus at least to change the differential signal reception pattern by changing power and phase weights of an antenna of the apparatus.

According to any of the examples of the second aspect, the at least one memory and the computer program code are configured to, with the at least one processor, cause the apparatus at least to monitor the determined differential signal reception radiation pattern after a first time period, and change the determined differential signal reception pattern when a quality threshold is not met.

According to any of the examples of the second aspect, the at least one memory and the computer program code are configured to, with the at least one processor, cause the apparatus at least to perform at least one of digital, hybrid and analog beam steering.

According to any of the examples of the second aspect each of the plurality of stored radiation patterns is associated with a respective direction of arrival.

According to a third aspect there is provided an apparatus comprising: receiving circuitry for receiving at least one signal from at least one transmitter; determining circuitry for determining at least one parameter of the at least one signal; determining circuitry for determining, based on the at least one parameter, which of a plurality of stored differential signal reception radiation patterns the received signal corresponds to, the plurality of stored radiation patterns associated with a direction of arrival; and aligning circuitry for aligning an antenna beam to the transmitter based on the direction of arrival associated with the determined stored differential signal reception radiation pattern.

According to a fourth aspect there is provided a method comprising: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

According to an example of the fourth aspect, the at least one signal is a reference signal.

According to any of the examples of the fourth aspect, the reference signal comprises one of a synchronisation signal block, a demodulation reference signal, a channel state information reference signal, a specific beam alignment reference signal and a sounding reference signal.

According to any of the examples of the fourth aspect, the transmitter comprises one of a base station and a user equipment and the receiving is at an apparatus which comprises the other of the base station and the user equipment.

According to the above example, the method is performed at a user equipment and the method comprises receiving one or more synchronization signal block sweeps from the base station, and selecting the synchronization signal block sweep with the best reference signal received power for time synchronization using a primary synchronization signal and a secondary synchronization signal, which are part of the synchronization signal block.

According to the above example, the method comprises decoding of master block information to obtain burst sequence information of the one or more synchronization signal block sweeps.

According to the above example, the method comprises using decoded master block information to determine when the base station will next be configured with the synchronization signal block sweep with the best reference signal received power, and time transmission of the user equipment accordingly.

According to any of the examples of the fourth aspect, the method comprises determining an identity of the transmitter.

According to any of the examples of the fourth aspect, the method comprises determining that the power of the at least one signal is higher than a threshold value.

According to any of the examples of the fourth aspect, the method comprises determining a parameter of the at least one signal by comparing at least one of a power and a phase of a first reception of the signal with the at least one of a power and a phase of a second reception of the signal.

According to the above example, the first reception of the signal is received at at least one first antenna radiation pattern and the second reception of the signal is received at at least one second antenna radiation pattern.

According to any of the examples of the fourth aspect, the method comprises changing the differential signal reception pattern to obtain a more accurate direction of arrival.

According to the above example, the method comprises changing the differential signal reception pattern by changing power and phase weights of an antenna.

According to any of the examples of the fourth aspect, the method comprises monitoring the determined differential signal reception radiation pattern after a first time period, and changing the determined differential signal reception pattern when a quality threshold is not met.

According to any of the examples of the fourth aspect, the method comprises performing at least one of digital, hybrid and analog beam steering.

According to any of the examples of the fourth aspect each of the plurality of stored radiation patterns is associated with a respective direction of arrival.

According to a fifth aspect there is provided a computer program comprising instructions for causing an apparatus to perform at least the following: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

According to a sixth aspect there is provided a computer program comprising instructions stored thereon for performing at least the following: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

According to a seventh aspect there is provided a non-transitory computer readable medium comprising program instructions for causing an apparatus to perform at least the following: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

According to an eighth aspect there is provided a non-transitory computer readable medium comprising program instructions stored thereon for performing at least the following: receiving at least one signal from at least one transmitter; determining at least one parameter of the at least one signal; determining, based on the at least one parameter, which of a plurality of stored differential signal reception radiation patterns the received signal corresponds to, the plurality of stored radiation patterns associated with a direction of arrival; and aligning an antenna beam to the transmitter based on the direction of arrival associated with the determined stored differential signal reception radiation pattern.

In the above, many different embodiments have been described. It should be appreciated that further embodiments may be provided by the combination of any two or more of the embodiments described above.

DESCRIPTION OF FIGURES

Embodiments will now be described, by way of example, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
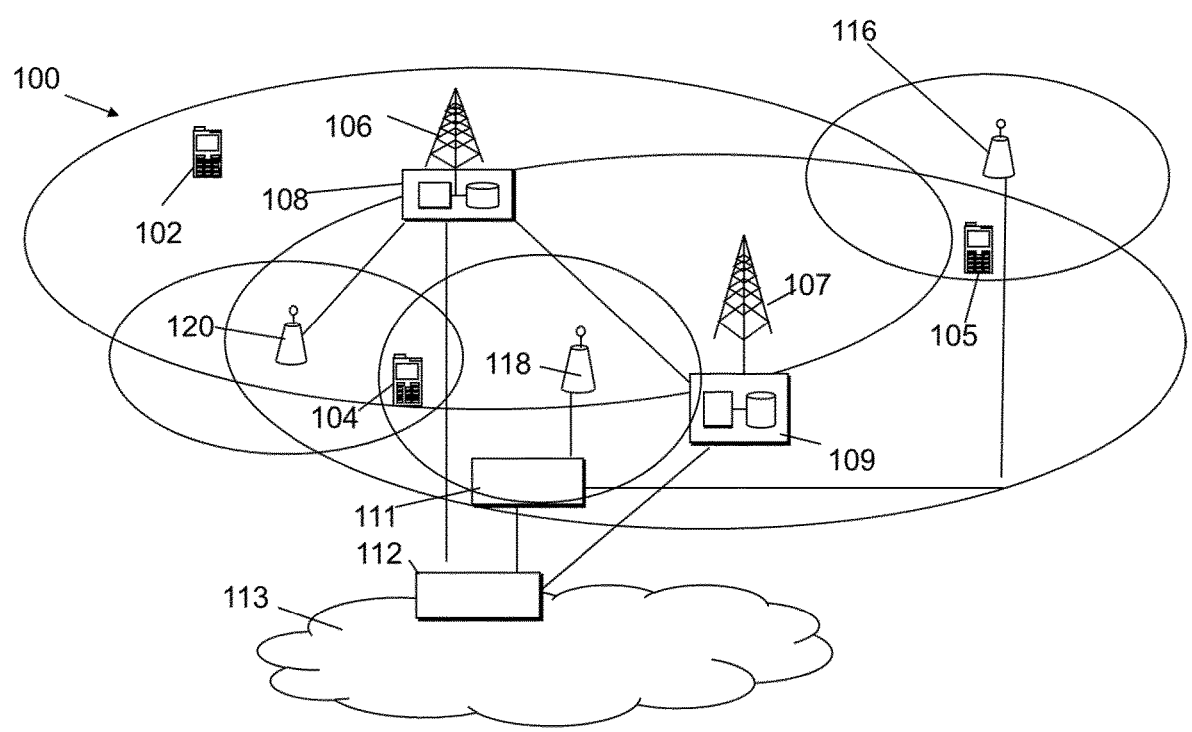
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches.

NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
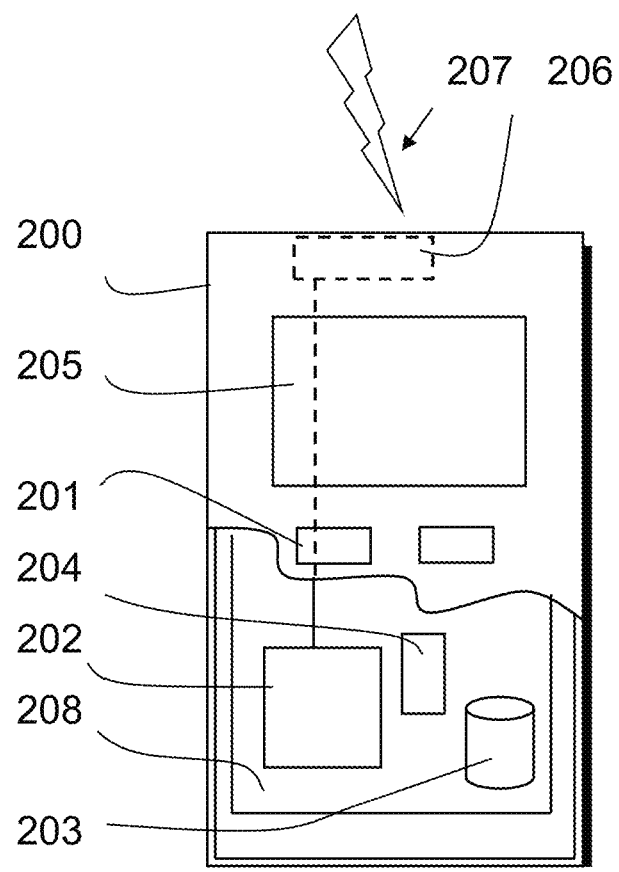
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
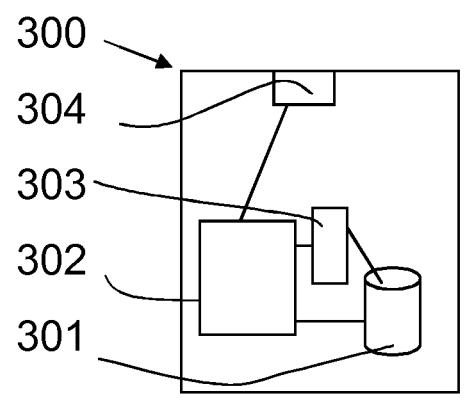
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Multiple antennas or antenna arrays are part of 3GPP rel. 15 for 5G NR both for the gNB and the UE as an option to increase the system performance by utilizing the additional antenna gain. The new added frequency ranges FR2 & FR3 (mmWave) in 5G NR may require this to compensate for the increased free space loss at the high frequencies (24 GHz to >100 GHz).

One disadvantage of using antenna arrays may be the reduced radiation beam width which limits the area/coverage where the system link will be improved. Other directions/areas may be impacted and establishing a useable communication link might not be possible. The reduced coverage may be counteracted by utilizing beam steering where the antenna array radiation beam is focused in the direction of the gNB or the UE. The beam-steering may be controlled by a pre-defined codebook, which contains the setting of the phase and/or amplitude for the different antenna elements in the array, to steer the beam in given directions.

Figure 4:
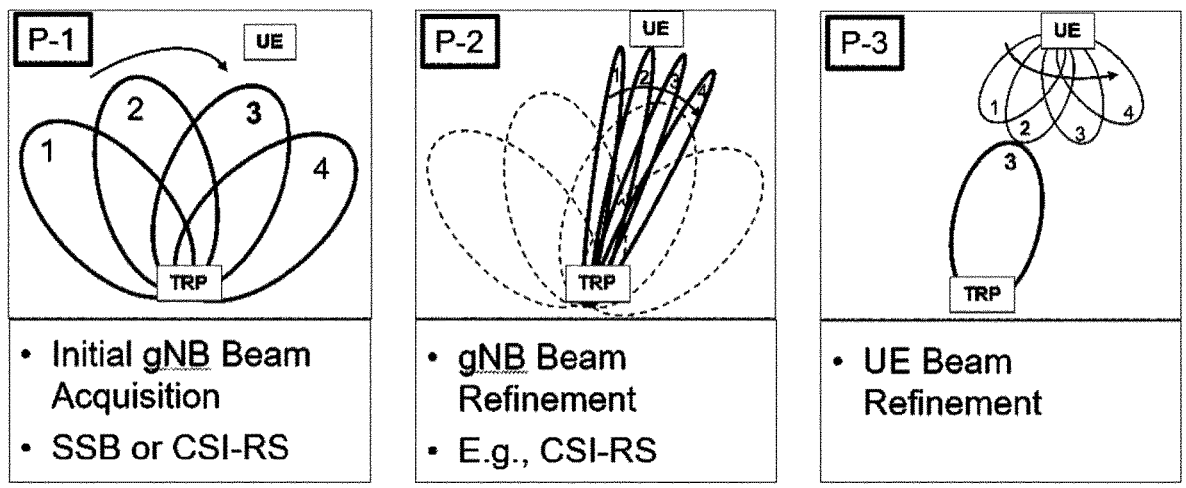
FIG. 4 shows a schematic diagram of a beam alignment procedure for 5G NR above g6 GHz.

FIG. 4 shows a schematic diagram of a procedure for "open loop trial and error beam alignment (BA)" between the gNB and the UE which has been standardised on 3GPP Rel. 15.

In the procedure shown in FIG. 4, the gNB transmits synchronization signal blocks (SSB) in different directions with broader antenna beam widths (P-1) than used for the actual data transmission. The UE signals back to the gNB which of the SSB was received with the highest power, where after the gNB can refine its narrower beams in that sector only (P-2). The UE will next initiate its beam refinement procedure (P-3) where it will cycle through all its beams to find the best match.

The standard 3GPP BA may be time consuming when both the gNB and the UE have very narrow radiation beams, which may be the case for many applications in FR2 & FR3 frequency ranges. At these carrier frequencies, a high antenna gain (and hence narrow radiation beam width) may be essential to establish and keep the communication link between the gNB and the UE. The time-consuming 3GPP BA may be critical to ultra-low latency applications, but also for eMBB, since the re-initialization procedure may be time consuming (resulting in data loss) when the connection is lost due to changes in the environment, such as when the user is suddenly blocking the link or changing the orientation of the UE.

Figure 5:
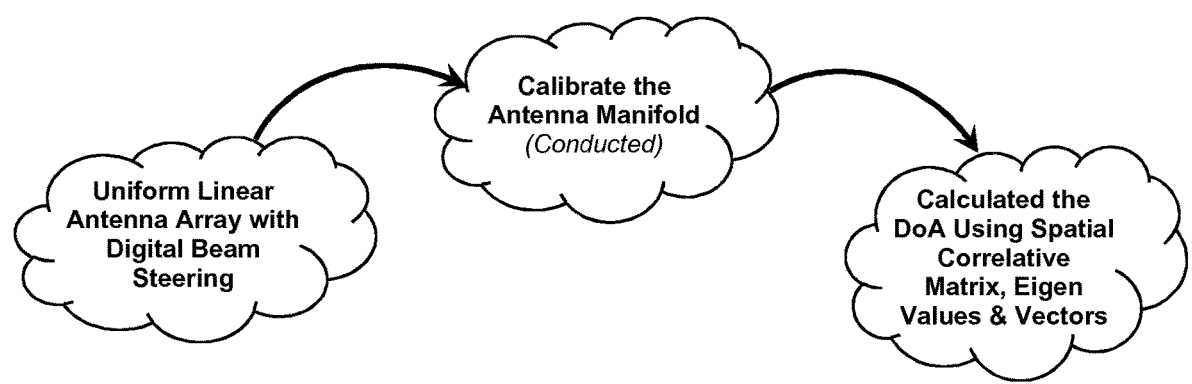
FIG. 5 shows a flowchart of a beam alignment procedure.

FIG. 5 shows an example beam alignment procedure which may take place at a gNB. The beam alignment procedures shown in FIG. 5 assumes digital beam steering at a Uniform Linear spaced antenna Array (ULA) where all the antenna element have the same radiation pattern, are well isolated and there is signal coherency at the antenna ports (elements).

The coherency is aligned by performing conducted calibration at the antenna ports. This calibration feature is build-in part (circuitry) of the antenna array/RF Front-End.

The far-field characteristics of the antenna array are now calculated together with the Spatial Correlative Matrix. The Eigen-Values may now be optimized for maximum Power or SINR and the Eigen-Vector corresponding to those Eigen-Values can be derived which provides the Best Direction of the beam.

However, digital beam steering and ULA behaviour for antenna array in a UE at mmWave may not always be the case. Digital Beam Steering requires one ADC/DAC for each element in the array, which will increase the cost and power consumption in the UE. In addition, ULA cannot always be guaranteed, since the antenna array will have to be integrated into the Industrial Design (ID) of the device where different areas of the array can be affected differently due to the non-antenna optimized surrounding inside a typical UE.

Calibrating the antenna manifold at mmWave frequency may be difficult due to the small size of the antenna array at these frequencies. In addition, assuming coherency at the antenna ports will often not be valid for UE implementations (it may be valid for gNB's), since these designs are optimized for low cost, low power consumption and small size.

The accuracy of the Rel15 approach depends on how well the above points are estimated and such estimates may be more accurate for a gNB than a UE.

Figure 6:
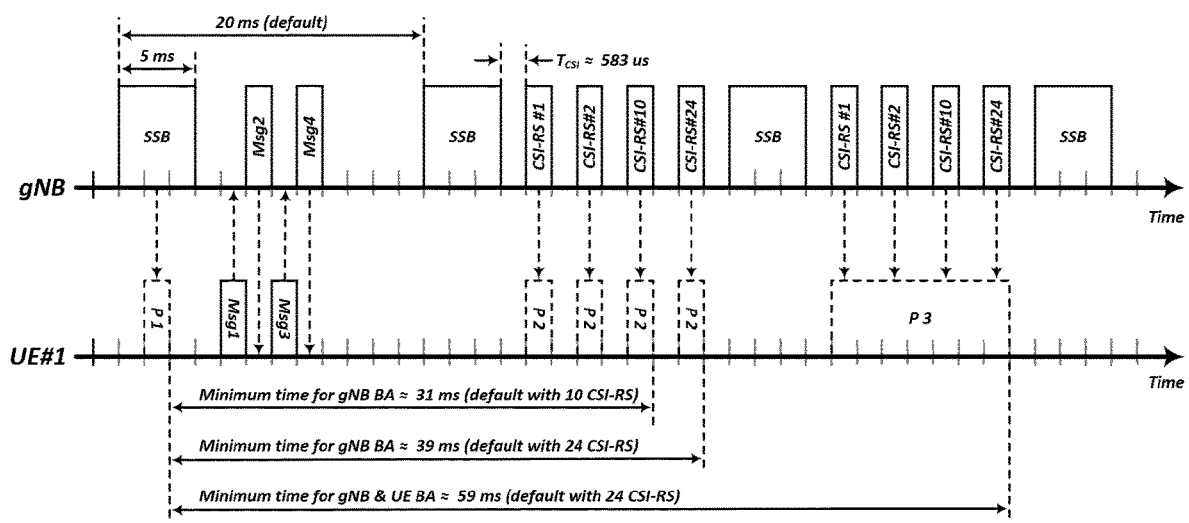
FIG. 6 shows a beam alignment signalling procedure.

FIG. 6 shows an example of the BA signalling for FR2 as described in 3GPP Rel15.

The minimum TCSI time interval is calculated for a duration of 5 slots (can be between 5 and 640 slots) and with a symbol duration of 8.33 μs corresponding to a SCS of 120 KHz: TCSI=5 slots×14 symbols×8.33 μs=583.1 μs Assuming that all messages are received and decided at the first attempt, the estimated minimum BA time for the current FR2 beam alignment procedure is between 31 ms and 59 ms depending on the number of iterations and of different beams at the gNB and the UE and with a SSB periodicity of 20 ms.

Figure 7:
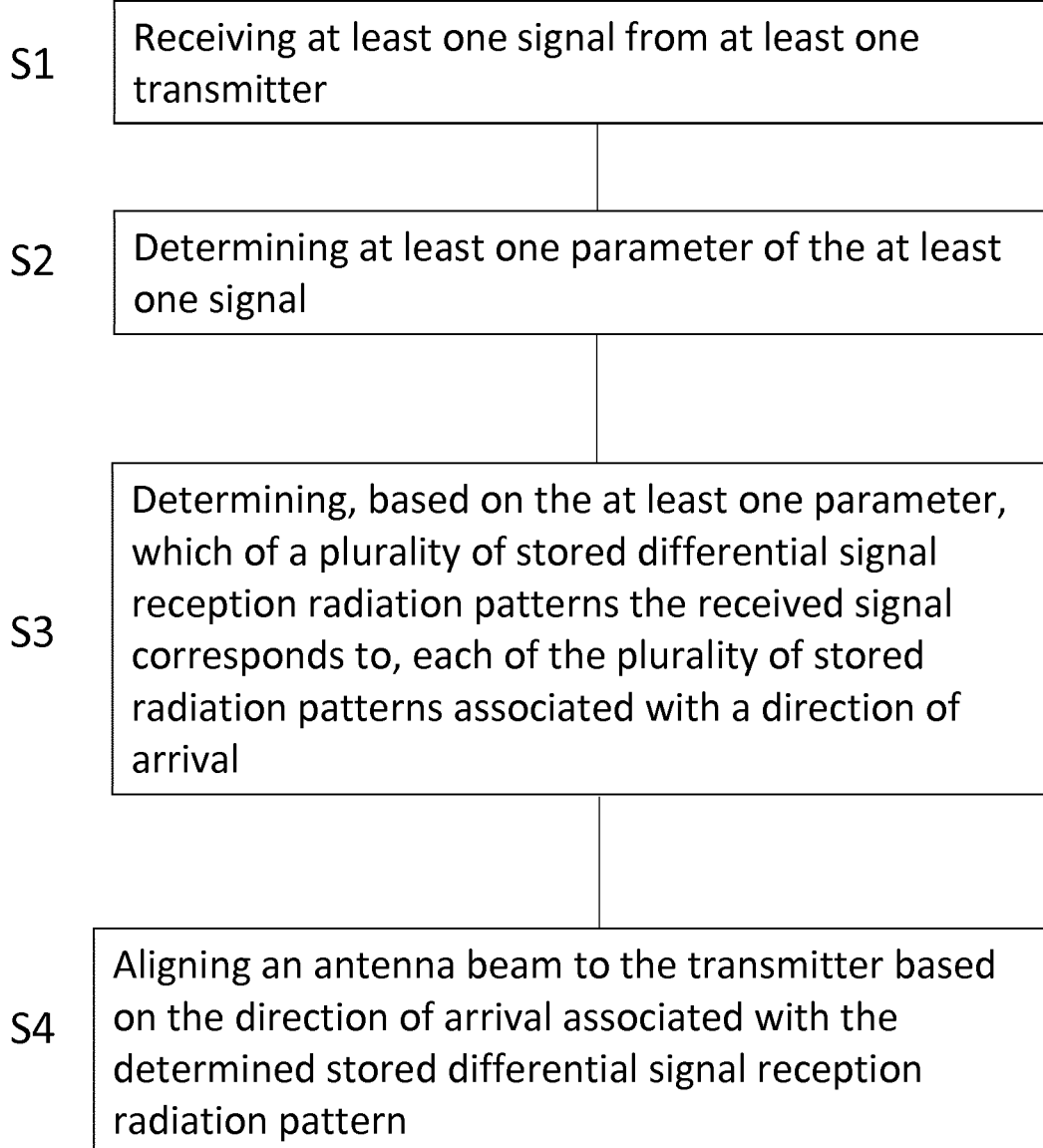
FIG. 7 shows a flowchart of a method according to an example embodiment.

FIG. 7 shows a flowchart of a method according to an example embodiment.

In a first step, S1, the method comprises receiving at least one signal from at least one transmitter.

In a second step, S2, the method comprises determining at least one parameter of the at least one signal.

In a third step, S3, the method comprises determining, based on the at least one parameter, which of a plurality of stored differential signal reception radiation patterns the received signal corresponds to, each of the plurality of stored radiation patterns associated with a direction of arrival.

In a fourth step, S4, the method comprises aligning an antenna beam to the transmitter based on the direction of arrival associated with the determined stored differential signal reception radiation pattern.

In the method, uncorrelated DSR radiation patterns are created on an antenna array of a device by using different groups of array elements, which don't have to be adjacent elements. The known DRS patterns are stored in the device. The received power and/or phases differences from an incoming signal are correlated to the used and stored DSR patterns to derive a Direction of Arrival.

Figure 8:
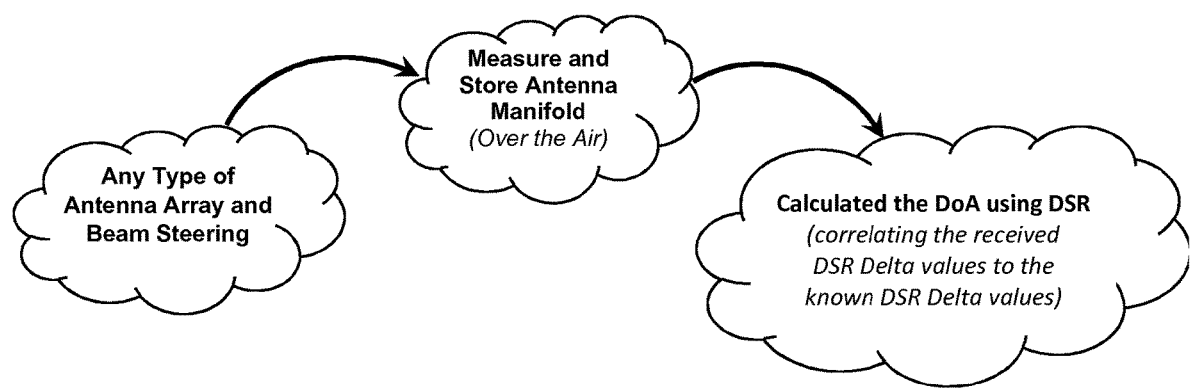
FIG. 8 shows a flowchart of a beam alignment procedure according to an example embodiment.
Figure 9:
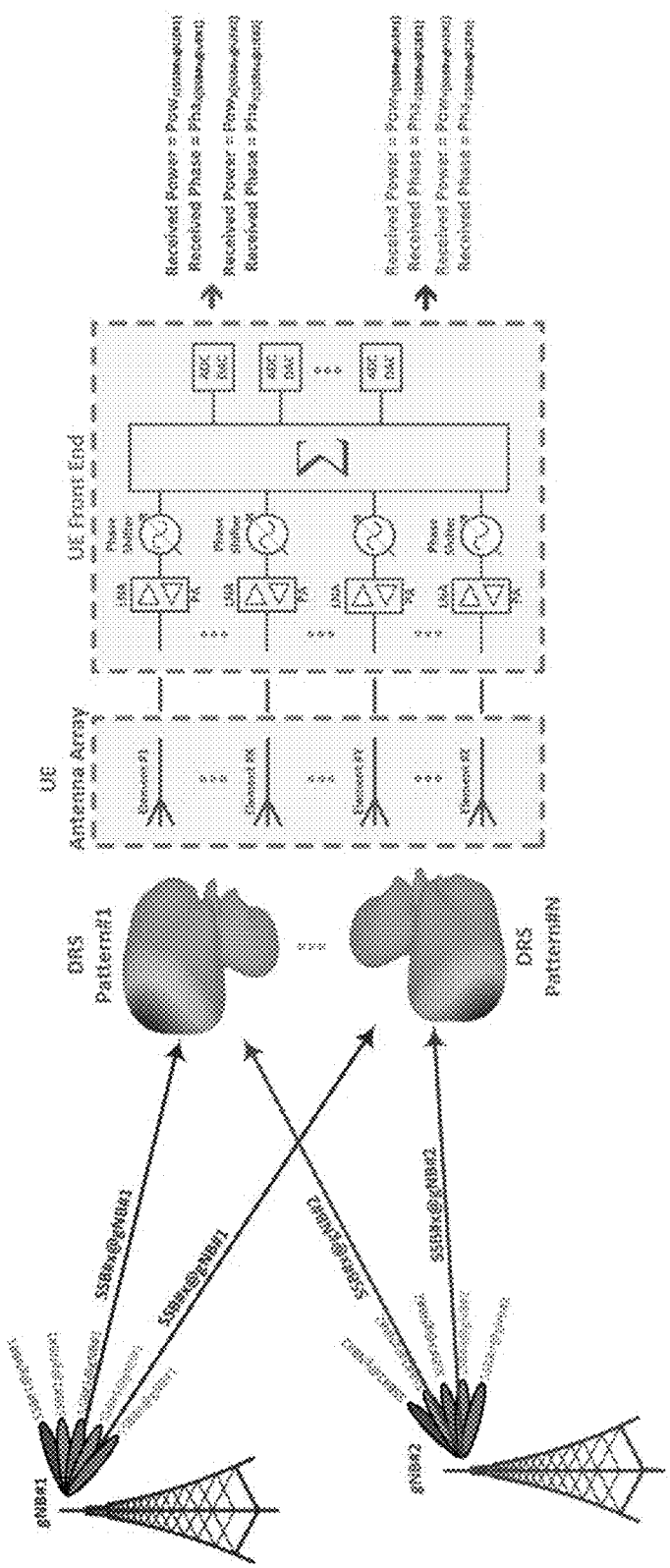
FIG. 9 shows a schematic diagram of a DSR beam alignment procedure at a UE according to an example embodiment.

The mechanism may be referred to as Instantaneous beam alignment (IBA) and management (IBM) based on differential signal reception (DSR). The mechanism may provide a fast Beam Alignment (BA) and Beam Management (BM) procedure for 5G NR FR2 and future mmWave applications where a RF Front-End uses multiple uncorrelated known and stored radiation patterns (called henceforth DSR branches) to receive and simultaneously process the transmitted Reference Signal (SSB/DMRS/CSI-RS/SRS) as illustrated in FIG. 8 and FIG. 9.

The primary use cases for IBA-DSR and IBM-DSR is for UE's and smaller (simpler) gNBs. The method may be used on any gNB and therefore potentially be combined with existing solutions.

IBA-DSR may be used on any kind of antenna array (e.g., an antenna with non-linear element spacing, an array with different types of elements (patches, dipoles and/or monopoles) each having different radiation patterns and antenna using any kind of beam steering (Digital, Hybrid and Analog), either at a gNB or a UE. By hybrid beam steering is meant a combination of analog and digital beam steering.

IBA-DSR and IBM-DSR is a beam alignment/management procedure that is independent of the Antenna array (which may be un-calibrated) and can be used with all types of antenna arrays with, e.g., different element spacings, different types of element, different radiation patterns of the elements, poor isolation between the elements. The antenna array characteristics don't need to be known, since they are covered by the stored DSR radiation patterns.

The procedure is independent of the transceiver architecture. It may be used with Digital, Hybrid or Analog beam steering. The procedure is also independent of the state of the UE. The UE may be in RRC Connected state, RRC Inactive State or RRC Idle state.

FIG. 9 shows a IBA-DSR beam alignment procedure at a UE

The non-symmetrical properties will be captured in the OTA measured reference DSR patterns that stored in the device The Direction of Arrival (DoA) is calculated by correlating the different power and phase values of the received reference signal (e.g., SSB, CSI-RS, DMRS, SRS, etc.) with the different stored DSR patterns.

IBA may, in principle be used on any type of RF Front-End with Analog, Hybrid and Digital beamsteering, where the number of available ADC/DAC's will determine the number of DSR patterns that can be monitored at the same time and thereby decrease the number of iterations needed for calculating the DoA with a certain probability. Each DSR pattern requires a minimum two dual polarized elements where each polarization RF branch is connected to a separate ADC/DAC or that the reference signals are transmitted on both polarizations from the gNB (then only one polarization is needed at the UE for DSR). FIG. 9 illustrates a network where a UE antenna array is receiving signals from two gNBs, gNB #1 and gNB #2. Consider the scenario depicted in FIG. 9 above. This example is a 1×4 dual feed patch array, where each feed point (vertical and horizontal) on each patch element is connected to its own PA/LNA, Phase Shifter and ADC/DAC. Patch element #1 & #2 are configured to create a radiation beam in one direction (DSR Branch #1), while patch element #3 & #4 are configured to create a radiation beam in a different direction (DSR Branch #2).

A Front-End using analog beam-steering will have two ADC/DAC's, one for each polarization.

RF Front-Ends supporting digital or hybrid beam steering will enable multiple simultaneously DSR branches depending of the number of available ADC/DAC's.

With four ADC/DAC's, there are two simultaneous DSR branches and 2 DSR correlations (this may not result in high DoA probability and it will be necessary to sequentially switch between different DSR patterns until the probability limit has been obtained).

With eight ADC/DAC's, there are four simultaneous DSR branches and 12 DSR correlations (this may result in a high DoA probability and sequential switching of DSR patterns may be used to further increase the accuracy).

With sixteen ADC/DAC's, there will be eight simultaneous DSR branches and 72 DSR correlations (this may be sufficient for a high DoA accuracy).

The first DSR calculation may be carried out when the RSRP level of the received reference signal is high enough on all used DSR branches. All SSB beams received with sufficient RSRP signal level may be used for IBA-DSR calculations and refinements even though they will be transmitted in different directions at the gNB. The power shift from one SSB to the next at the UE is not an issue, since the DSR procedure relies on relative values between the active DSR branches.

For current 3GPP SSB beam sweeping procedures, and if the UE receiver is analog, since the received RSRP signal level will change from SSB beam to SSB beam the DSR delta value (difference between 2 DSR radiation patterns) must be found for the same SSB beam, meaning that the 2 available DSR branches patterns are active at the same time. Each of the DSR branches will only collect RSRP signal level information from one polarity and a relation between the two receives orthogonal polarizations must be establish before the DSR delta values can be found. This may be done by having equal standard radiation patterns on the first measurement and using this as a calibration value for the upcoming DSR measurements.

In one example embodiment vertical to horizontal measurement with equal beams on first SSB beam with sufficient RSRP signal level is a reference. The different DSR patterns on the two different polarizations are determined for the next SSB beam. The DSR patterns per SSB beam are changed until DoA is determined or there is insufficient RSRP signal level. The process is repeated in the next SSB cycle to further increase the accuracy)

One reference iteration and six DSR iterations will result in the same accuracy as 4 simultaneous DSR patterns. So around 7 SSB signals must be received with sufficient signal level in order to calculate a DoA with sufficient accuracy using DSR.

The reliability on DSR on Front-ends using analog beam-steering may be improved, if the used reference signal from the gNB did not change in power. A constant SSB beam covering the entire cell sector that is repeated with a given time interval or different SSB beams, each repeated x amount of time before swapping to the next SSB beam. This approach will avoid the reference measurement of the two polarizations.

In this approach, the SSB beam is repeated multiple times. The DSR pattern is received on both polarizations. The DSR patterns per SSB beam is changed until DoA is determined or there is insufficient RSRP signal level. The procedure may be repeated in the next SSB cycle if needed.

According to some examples 6 DSR iterations will result in the same accuracy as 4 simultaneously DSR patterns. So around 6 SSB signals must be received with sufficient signal level in order to calculate a DoA with sufficient accuracy using DSR.

This scenario assumes a channel coherency time larger the 5 ms (duration of SSB sweep) which corresponds to a velocity of approximately 120 km/h at mmWave. Channel coherency is needed for sequential DSR switching as it is for the current 3GPP BA procedure.

Beam tracking may be based on CSI-RS or DMRS reference signals which are more stable compared to the sweeping of the SSB signals used for the initial beam alignment.

UEs for FR2 will have to support 2×2 MIMO so a minimum of 2 ADC/DAC is required, one for the horizontal polarity and one for the vertical polarity (assuming a dual orthogonal polarized patch array).

In the following example (without loss of generality), the transmitter is a gNB and the receiver is a UE. The gNB transmits SSB consisting of multiple SS blocks (n) with different beam directions that, combined, will covers the entire cell sector.

Figure 10:
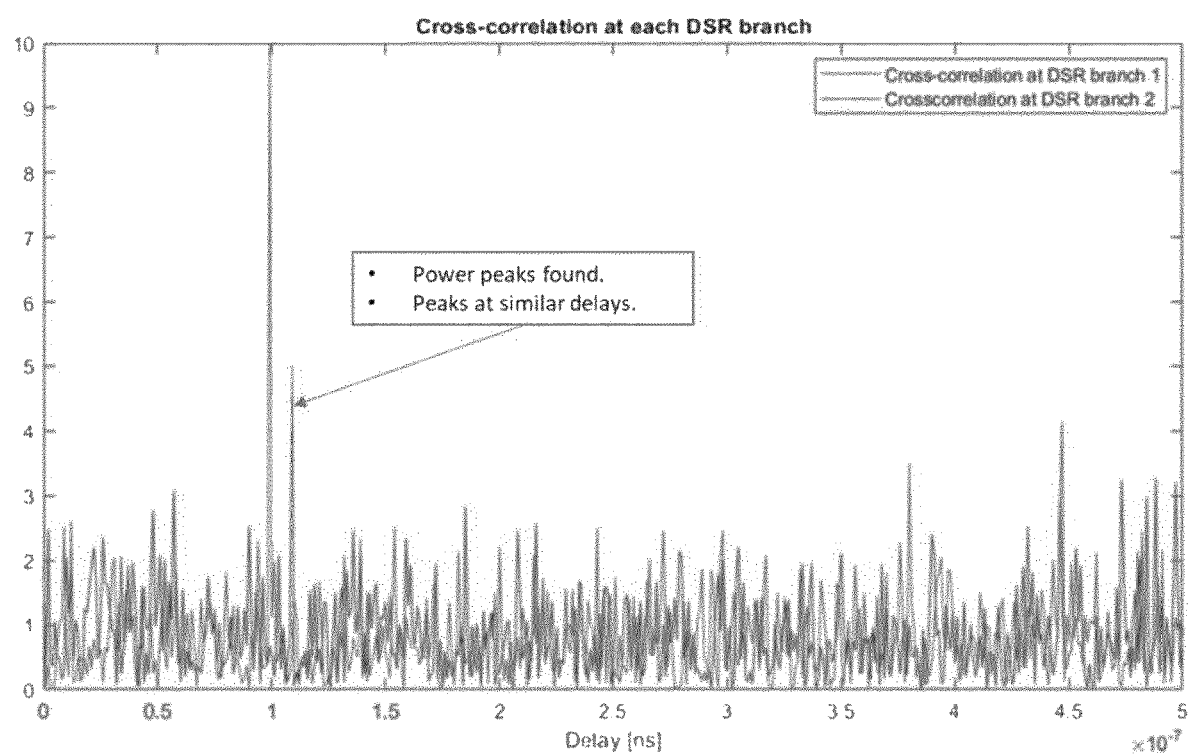
FIG. 10 shows cross correlation at a DSR branch 1 and a DSR branch 2.

After the UE receives the SS blocks at each DSR branch, it cross-correlates with the local known SSB sequences and identifies (using the SS block with the best signal level) whether the transmitter is a gNB (and its ID). If a gNB is found, IBA can be triggered. The UE also determines the propagation delay from the respective gNB to each of the DSR branches. FIG. 10 shows the cross correlation at each DSR branch.

If a valid transmitter has been identified, the UE aligns its beams to this transmitter. Specifically, the UE uses locally stored radiation patterns (i.e. power and phase obtained from free space measurements) for each DSR branch to map the power and phase of the incoming signal to a DoA. The resulting DoA is used by the UE to align its beam to the transmitting gNB.

Figure 11:
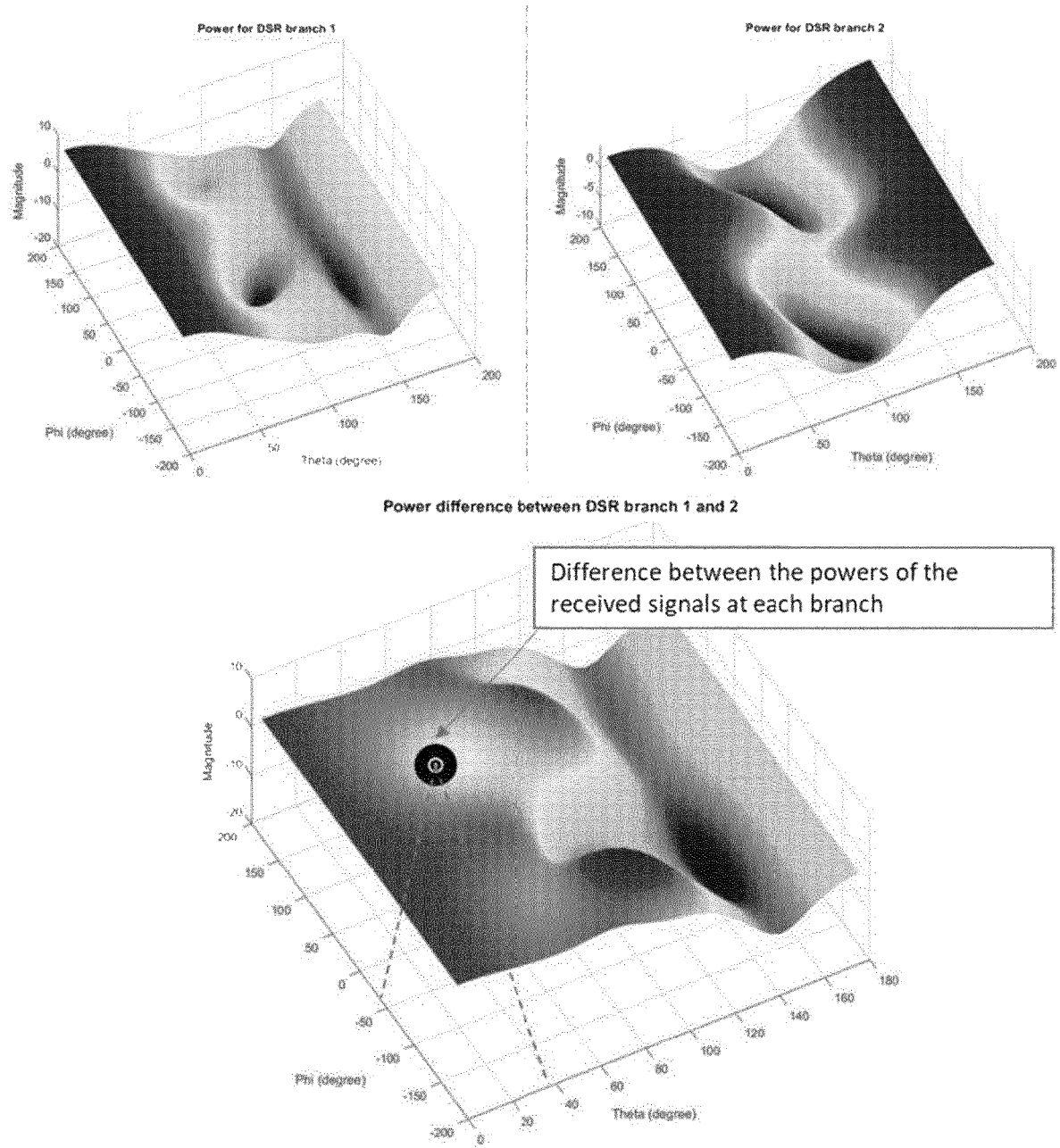
FIG. 11 shows a radiation pattern for a DSR branch 1, a DSR branch 2 and a differential radiation pattern for DSR branch 1 and DSR branch 2.

FIG. 11 shows free space radiation power patterns for DSR branch 1 and DSR branch 2, and the difference between the powers of the received signals at each branch. In some examples, a difference in power and phase of an incoming signal is measured with those two DSR radiation patterns (DSR branch 1 and DSR branch 2), and after that are correlated with the delta pattern (see bottom of FIG. 11) of the two used DSR patterns, to estimate possible directions. In some examples the apparatus (which is receiving the signals) stores the individual DSR patterns, and calculates the delta patterns to estimate a possible direction. In an alternative example the apparatus (which is receiving the signals) stores all possible combinations of delta patterns and use those directly to estimate a possible direction.

Storing the DSR patterns requires less memory, while storing the delta patterns requires less computation resources.

Figure 12:
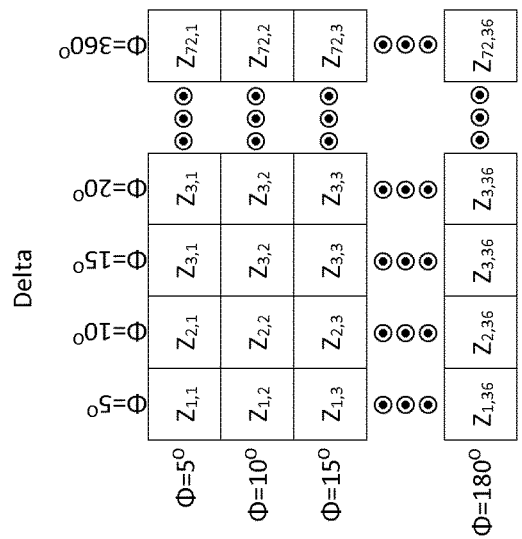
FIG. 12 shows free space radiation patterns tables at DSR branch 1 and DSR branch 2 and the delta table between them.
Figure 12:
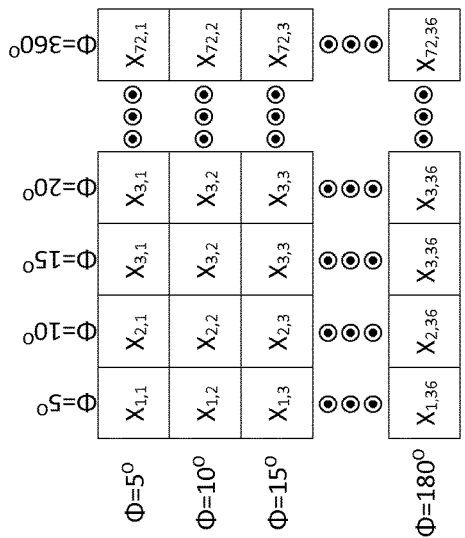
Figure 12:
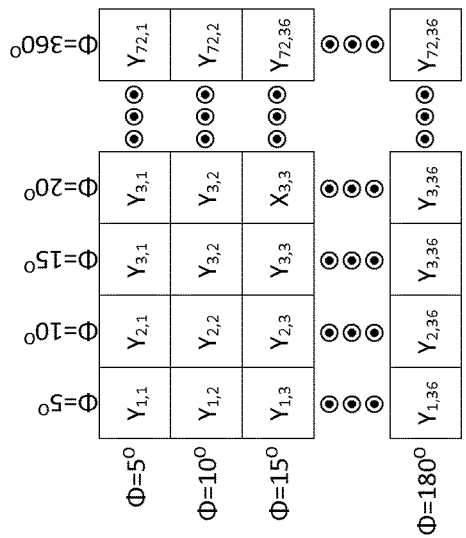

For each DSR branch, the UE has stored a table of free space radiation patterns that map a power level to a certain DoA given by the pair of angles (θ, Φ) as depicted in the left-hand-side of FIG. 12. Subtracting the two tables yields a theoretical differential power table (TDP) depicted in the right handside of FIG. 12. The TDP gives the mapping: Δ(θ, Φ). A similar table, i.e. a theoretical differential phase table (TDF) with ΔΓ(θ, Φ), is derived for the phase difference and is used in combination with the TDP to improve the DoA estimation accuracy.

The UE receives the SSB at each DSR branch. $SS_{DSR1}$ at DSR branch #1. $SS_{DSR1}=A_1 \cos(2\pi\gamma_1)$. $SS_{DSR2}$ is received at DSR branch #2. $SS_{DSR2}=A_2 \cos(2\pi\gamma_2)$, where Ai, γi are the amplitude and phase of the signal at branch i∈{1, 2}.

UE identifies the signal as being a valid signal as explained above. This operation is performed to avoid that the UE aligns with a random transmitter.

The UE computes the power difference: $\Delta P_{12}=P_1-P_2$, where $P_i=|SS_{DSRi}|^2$, i∈{1, 2} and the the phase difference:

$$\Delta\Gamma_{12} = \gamma_1 - \gamma_2 \text{ where } \gamma_i = \arccos\frac{SS_{DSRi}}{\sqrt{|SS_{DSRi}|^2}}, i \in \{1, 2\}.$$

The UE uses the locally stored TDP and TDF to find the pair DoA ($\theta_x$, $\Phi_y$) for which $\Delta P_{12}=\Delta(\theta_x, \varphi_y)$ and $\Delta\Gamma_{12}=\Delta\Gamma(\theta_x, \Phi_y)$.

If the information derived from the initial two uncorrelated radiation patterns is insufficient to estimate the DoA of the first SSB with enough accuracy, then the UE may change the two radiation patterns to two different and uncorrelated radiation patterns for the next SSB. In this way, the UE could have information from four different radiation patterns (6 delta TDP and 6 TDF tables) and significantly improve the DoA estimation accuracy.

Figure 13:
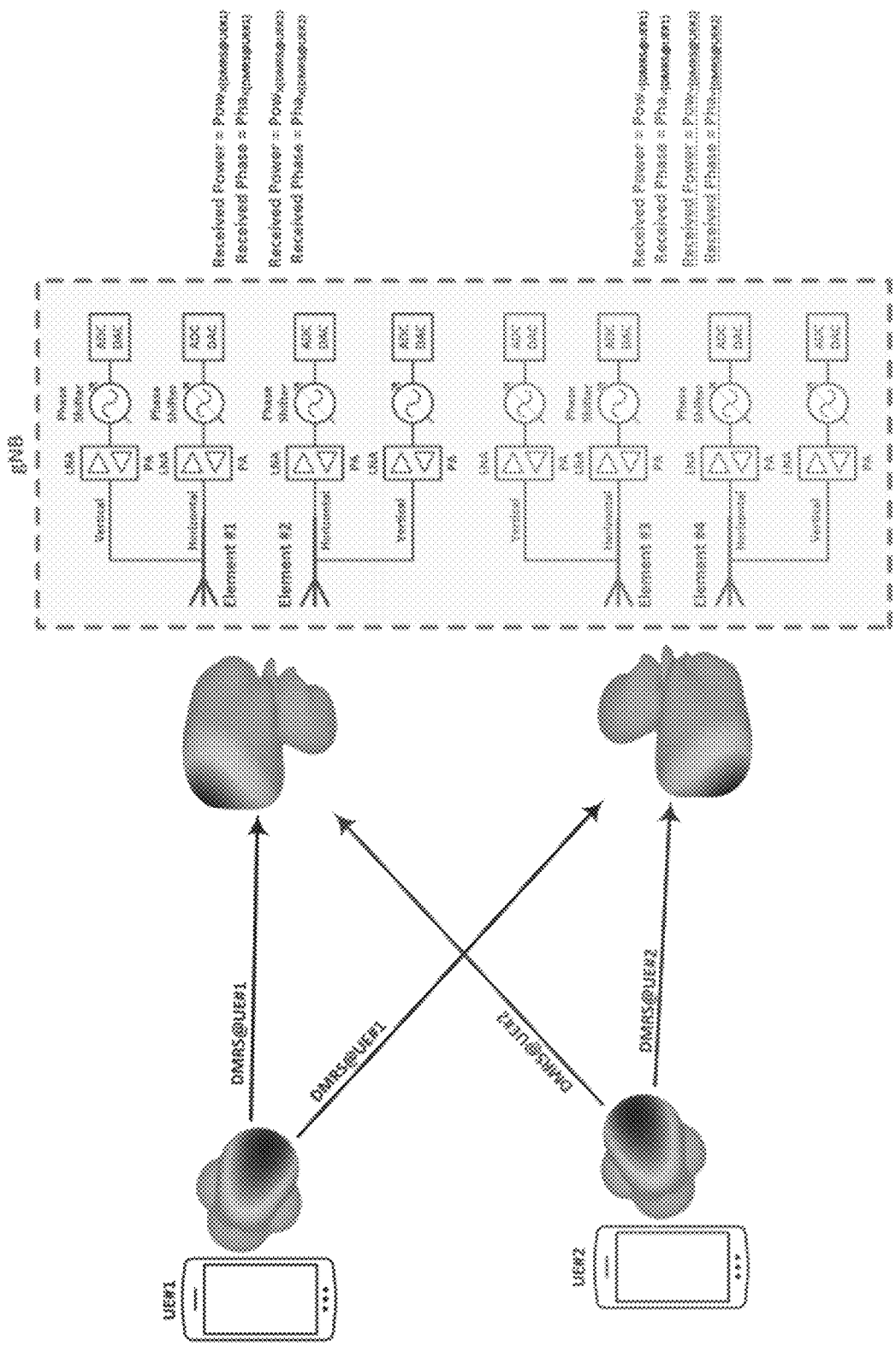
FIG. 13 shows a schematic diagram of a DSR beam alignment procedure for a multi-TRP according to an example embodiment.

After the UE has aligned to the gNB, the process may be performed in the opposite direction, so that the gNB finds the DoA needed to align its own beam to the UE. The process may be performed at the gNB after reception of the beam aligned UE reference signal (SRS/DMRS). FIG. 13 shows an example where IBA-DRS is reversed, i.e. the UEs in a sector transmit orthogonal DMRS/SRS in directions towards the gNB. The gNB receives the DMRS/SRS in a preconfigured antenna array setting and performs the procedure of signal validation and IBA as described above.

The UE will have to receive the SS blocks in two orthogonal polarizations on the same radiation pattern to be able to determine its power and phase for any incoming polarization of the gNB SSB/CSI-RS or that the reference signals are transmitted on both polarizations from the gNB. Then only one polarization is needed at the UE for DSR. The example illustrated in FIG. 12 is for dual feed polarization configuration used, which is the common way of obtaining a patch design with orthogonal polarization to support 2×2 MIMO with the antenna gain of both feeds.

Figure 14:
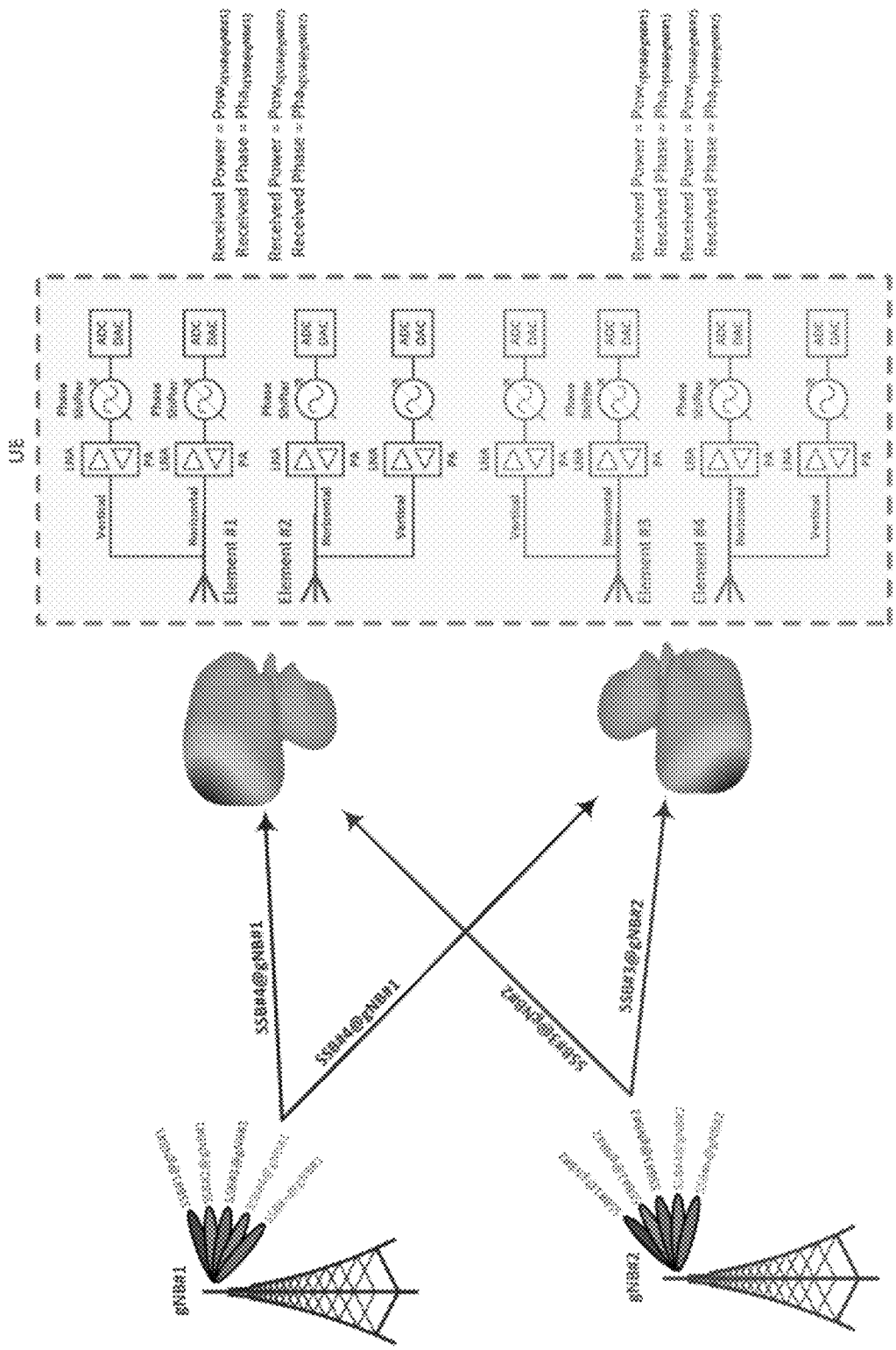
FIG. 14 shows a schematic diagram of a DSR beam alignment procedure at a gNB according to an example embodiment.

IBA-DSR may also be used for Multi-TRP as shown in FIG. 14. IBA-DSR generalizes well to a multi-TRP case, the only difference being that the UE receives and processes two orthogonal SSB signals to derive two different DoA.

The correct beam for the UE and gNB may be estimated in one or two iterations. Hence, DSR-IBA may significantly shorten the time need for the beam alignment procedure. For example, small sized antenna arrays, such 1×4 might need 2 iterations, where bigger antenna arrays may only need one iteration most of the time.

Figure 15:
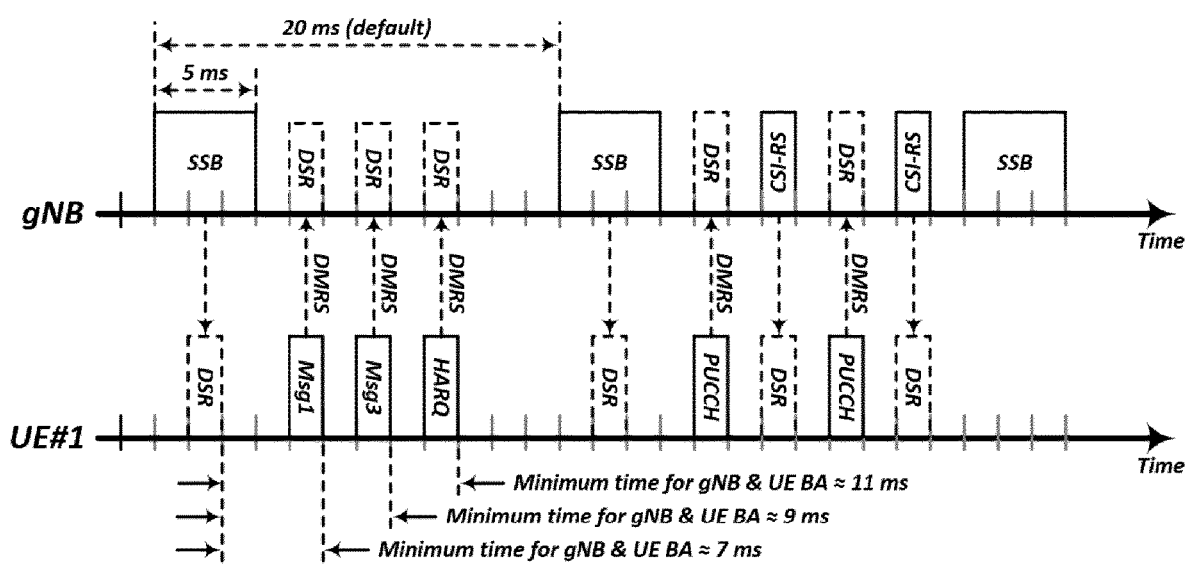
FIG. 15 shows a beam alignment signalling procedure according to an example embodiment.

FIG. 15 shows a signalling diagram for the IBA-DSR procedure. BA at the UE is derived by using IBA-DSR when receiving the gNB transmitted SSB. If the UE has insufficient data to derive the DoA for the first SSB, then it will change its DSR Branch radiation patterns for the next SSB signal, to collect more data. The gNB is using IBA-DSR when receiving the beam aligned DMRS from the UE. The gNB has several opportunities to use IBA-DSR during the IA procedure and can change its DSR Branch radiation patterns between those if needed. The beam alignment procedure using IBA-DSR will in most scenarios be completed within the initial access (IA) procedure, providing that the gNB and the UE has more than 2 to 4 DSR branches.

In some examples changing the DSR branch radiation pattern is caused by changing power and phase weights of an antenna of the apparatus. A specific set of antenna array weights will create a specific set of one or more DRS radiation patterns depending on how the signals are combined at the one or more ADC/DACs. In some examples the radiation patterns (DSR) when using those specific sets of weights is measured and stored in the apparatus.

The implemented IBA-DSR may decrease the standard 3GPP BA time by a factor of 3 to 8 in comparison with the time frame shown in FIG. 6. Factor of 3: 31 ms vs 11 ms. Factor of 8: 59 ms vs 7 ms.

DSR-IBA can also be extended for beam tracking in connected. Radar proximity detection or array element impedance changes may be used to detect objects in the near-field. Measurements from array with objects in the near-field will not be used.

Figure 16:
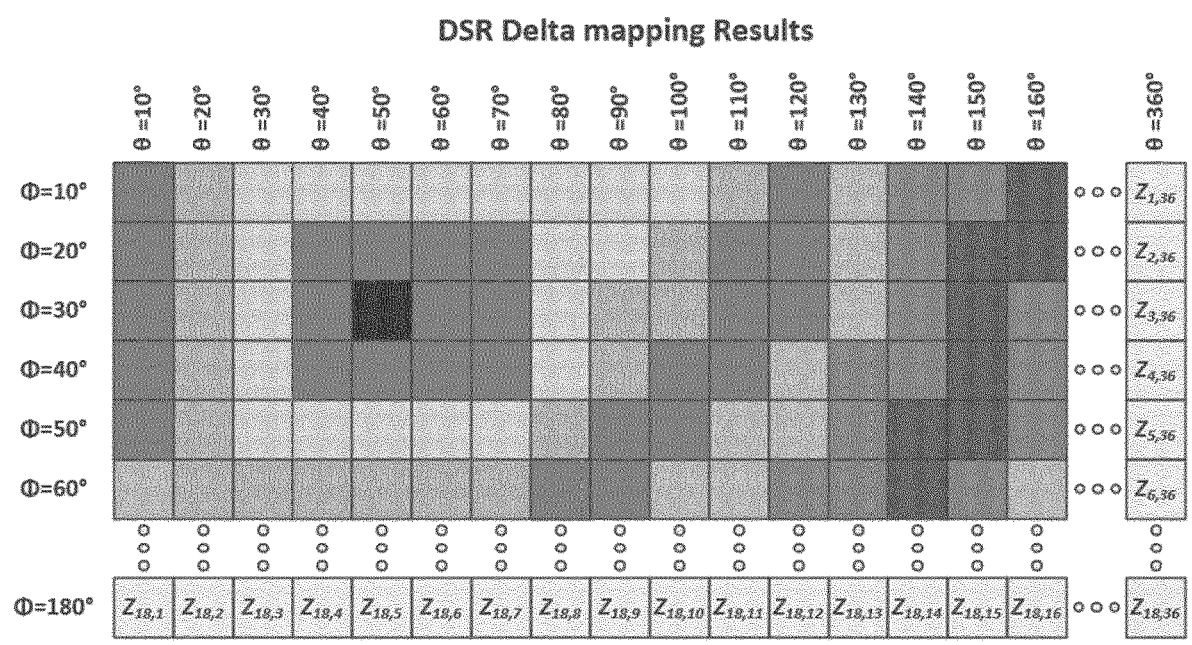
FIG. 16 shows a TDP/TDF table according to an example embodiment.

The dynamics of the TDP and TDF are illustrated below in FIG. 16, where the darker coloured squares are the most likely direction and the lighter coloured squares are the least likely direction, based on the DSR-IBM operations. The TDP/TDF shown in FIG. 16 indicate that the current most likely DoA of the gNB is at ⊖=50° & Φ=30° and the UE will use a beam that covers that direction. The DSR-IBM procedure can be performed periodically, triggered based on a local quality report not meeting a threshold level, or even initiated by the gNB.

Figure 17:
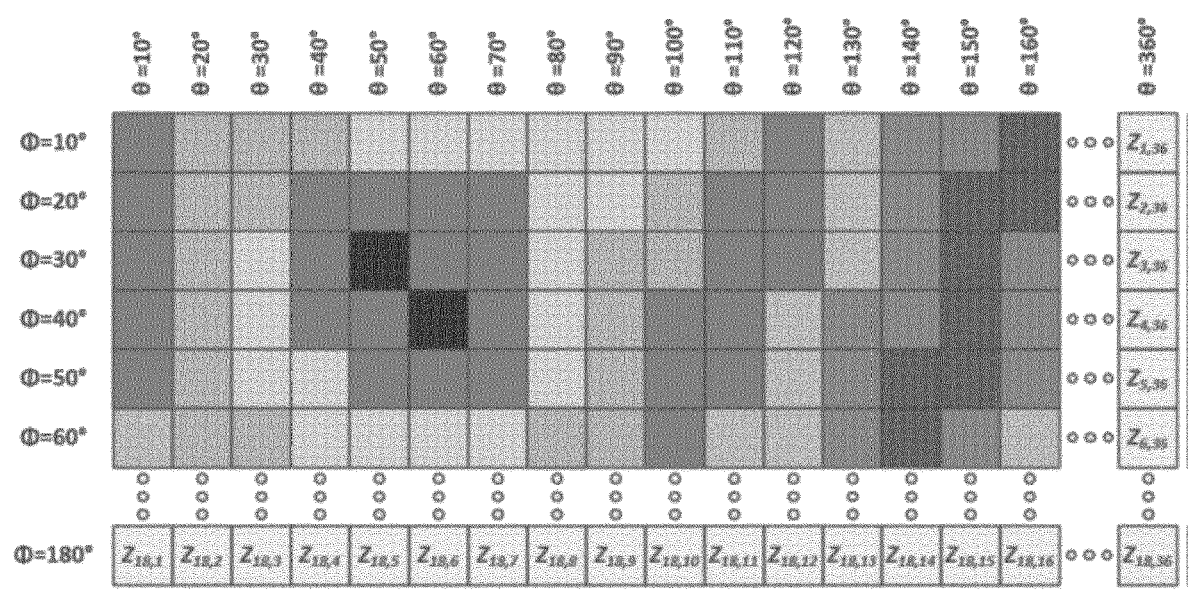
FIG. 17 shows a TDP/TDF table according to an example embodiment.
Figure 18:
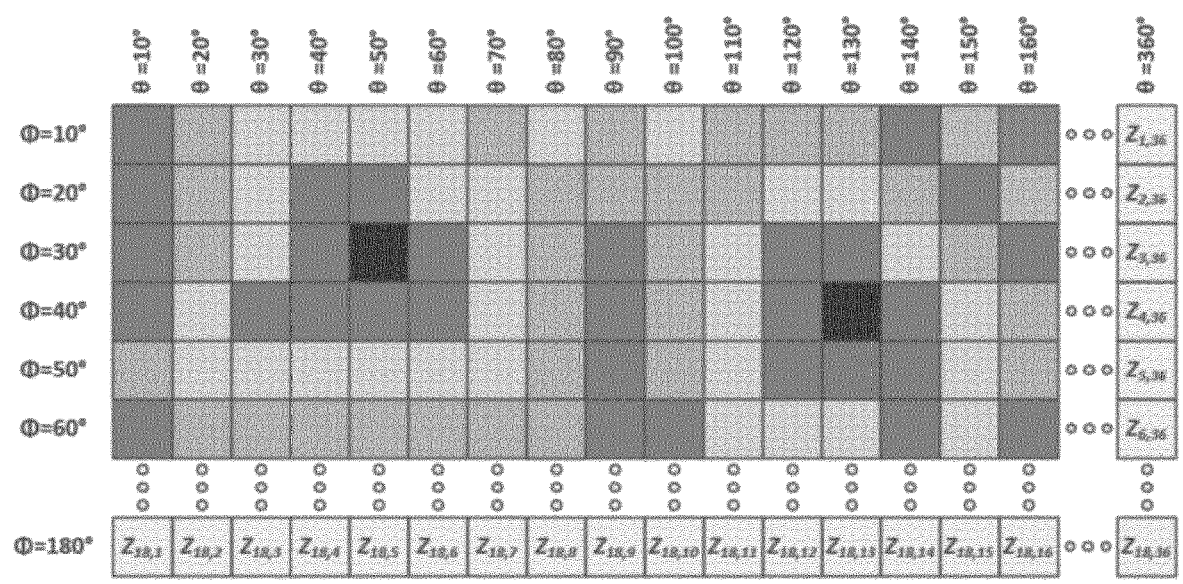
FIG. 18 shows a TDP/TDF table according to an example embodiment.

FIG. 17 shows an example where the UE is moving relative to the gNB and at some point in time, an adjacent direction in the TDP/TDF will be just as likely as the current one. FIG. 18 shows an example where a different reflection from the same gNB or a signal from another gNB will be just as likely as the current DoA. This is the point where the UE (or gNB) must decide if it will change its direction of its beam.

Figure 19:
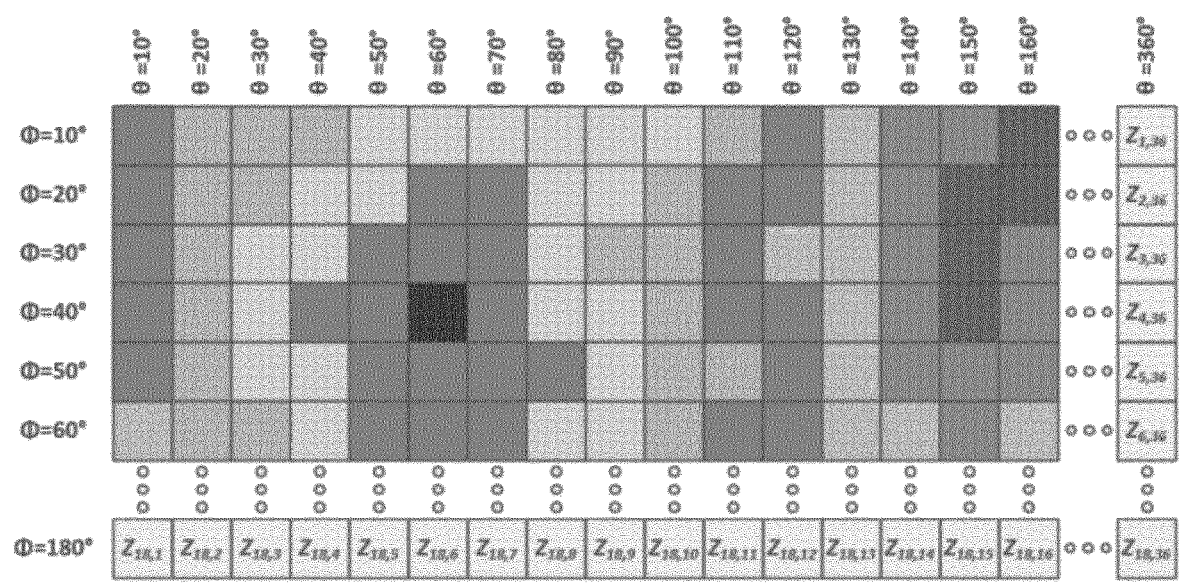
FIG. 19 shows a TDP/TDF table according to an example embodiment.
Figure 20:
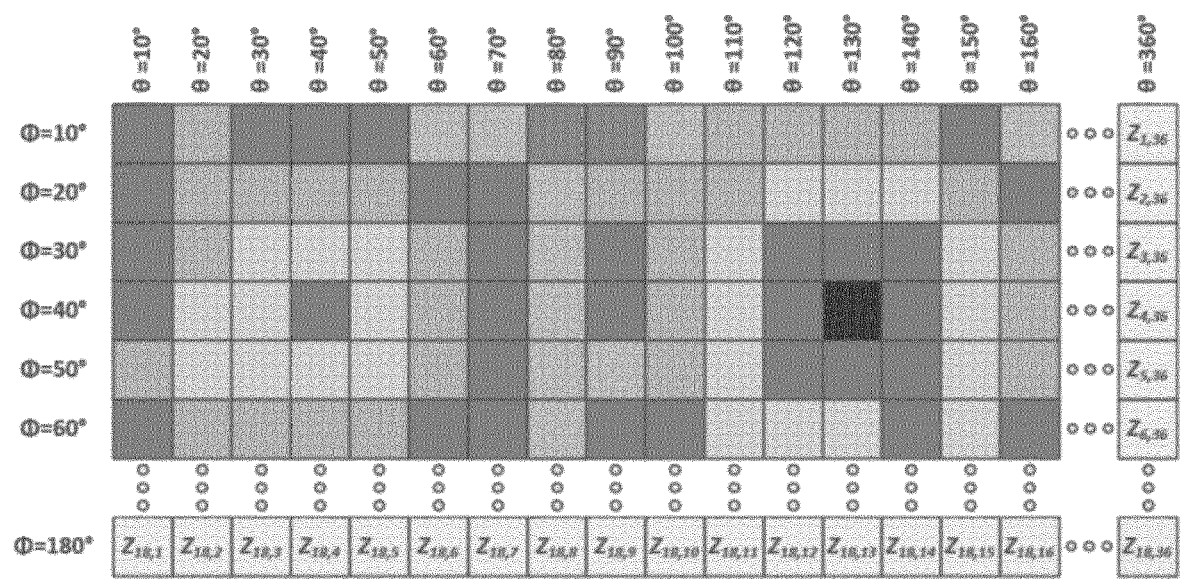
FIG. 20 shows a TDP/TDF table according to an example embodiment.

FIGS. 18 and 19 show two example TDP/TDF tables where the DOA has changed.

BM algorithm follows the beam alignment. In this situation, the UE and the gNB have aligned their beams and sustain a data link. However, to compensate for the environment variability, the gNB-UE pair needs to monitor the quality of the link and potentially adjust their beams if needed. BM is a set of procedures to allow the realignment of the initial beam-pair using e.g. CSI-RS in DL (at UE) and SRS in UL (at gNB). The procedure is transparent to the type of RS used and to the receiver (gNB or UE). Therefore, in the following the generic procedure from the UE viewpoint only is described although it may also be followed at the gNB.

Figure 21:
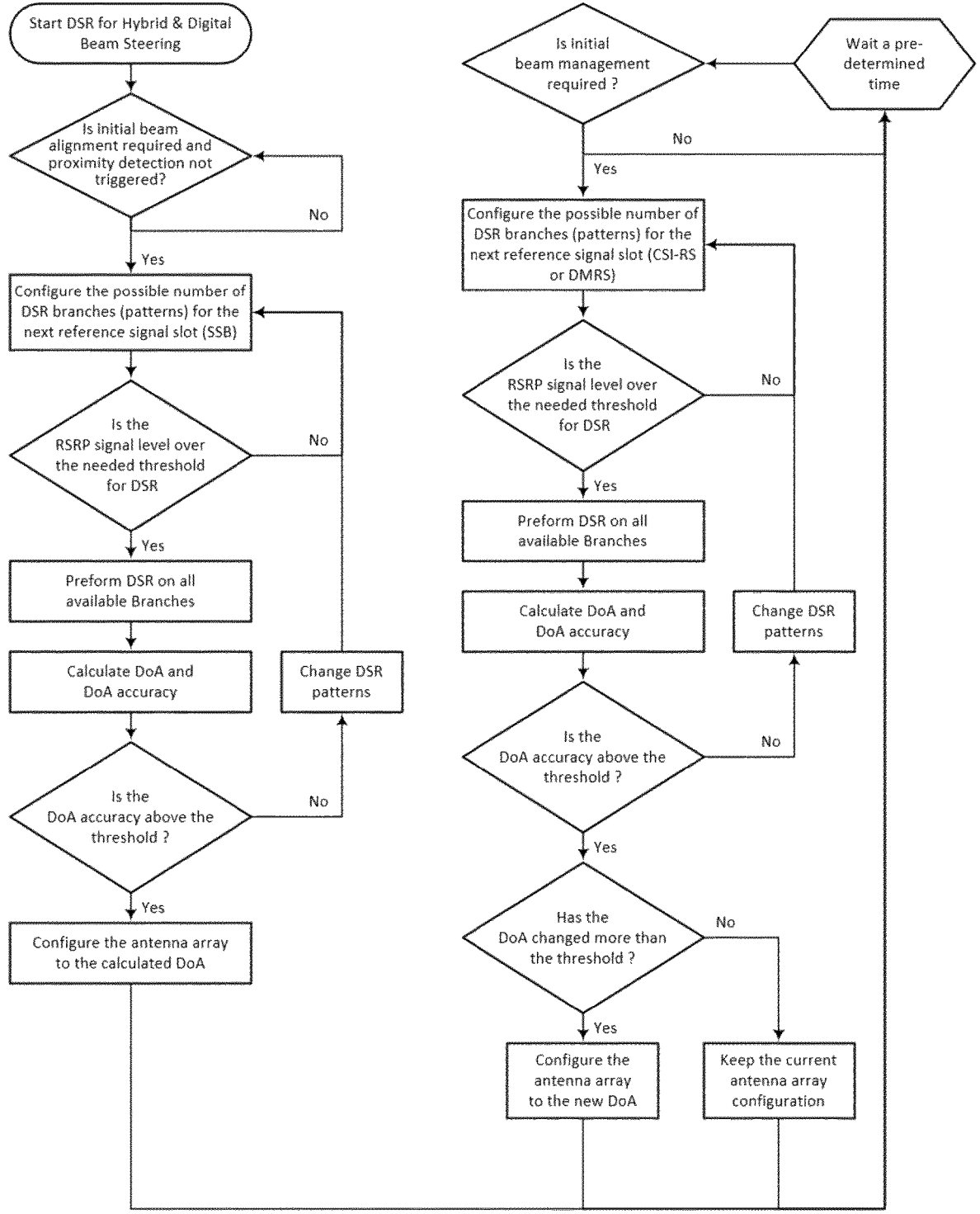
FIG. 21 shows a flowchart of a method according to an example embodiment.

At each $i \in \{1, \ldots, D\}$ branch of the D available DSR branches, the UE observes a signal:

$$y_i(t) = (h_{0,i} * x_0)(t) + \Sigma(h_{k,i} * x_{gnbk})(t) + \xi(t), \quad (1)$$

Where $h_0$ and $x_0$ are the channel impulse response between the serving gNB and the DSR branch i, and the RS of the serving gNB. The UE may receive signals from K other neighbor gNBs, that send their RS $x_{gnbk}$ over the channels $h_k$, as depicted in FIG. 21. Each channel is composed of a sum of taps, arriving at the receiver with different delays:

$$h_{k,i}(t) = \Sigma \alpha_{l,i} \delta(t - \sigma_{l,i}), k \in \{0, \ldots, K\}$$

Where $(\alpha_l, \sigma_{l,i})$ are the complex gain and delay of the l-th tap at branch i.

After sampling the received signal at each DSR branch, the UE cross-correlates the samples with known cell-specific RS, identifies and stores for each of the K+1 gNBs, the delay and power level of the strongest path: $\sigma(i, k)$, $P(i, k)$, $i \in \{1, \ldots, D\}$, $k \in \{0, \ldots, K\}$. At the end of this procedure, UE has stored a gNB tracking table such as that shown in Table 1.

TABLE 1

| BM instance | gNB | DSR branch 1 | ... | DSR branch D | DoA |
|---|---|---|---|---|---|
| p | 0 | τ(1, 0, p), P(1, 0, p) |  | τ(D, 0, p), P(D, 0, p) | N/A |
| ... | ... | ... | ... | ... | ... |
|  | K | τ(1, K, p), P(1, K, p) |  | τ(D, K, p), P(D, K, p) | N/A |

For each gNB, the UE computes the power difference between any two DSR branches and uses the locally stored TDP table to map it to a DoA. It can now populate the last column of Table 1. Table 2 shows a gNB tracing table with updated DoA.

TABLE 2

| BM instance | gNB | DSR branch 1 | ... | DSR branch D | DoA |
|---|---|---|---|---|---|
| p | 0 | τ(1, 0, p), P(1, 0, p) |  | τ(D, 0, p), P(D, 0, p) | $(\theta, \phi)_{0,p}$ |
| ... | ... | ... | ... | ... | ... |
|  | K | τ(1, K, p), P(1, K, p) |  | τ(D, K, p), P(D, K, p) | $(\theta, \phi)_{K,p}$ |

Using Table 3, the UE computes composite metrics that characterize the link quality to each gNB, i.e., the UE computes an overall time offset (e.g. by computing the average of the delays for each branch) and overall power (e.g. by computing the average of the powers recorded at each branch):

TABLE 3

| BM instance | gNB | Time offset | Main path power | DoA |
|---|---|---|---|---|
| p | 0 | $\tau_{avg}(0, p)$ | $P_{avg}(0, p)$ | $(\theta, \phi)_{0,p}$ |
| ... | ... | ... | ... | ... |
|  | K | $\tau_{avg}(K, p)$ | $P_{avg}(K, p)$ | $(\theta, \phi)_{K,p}$ |

Using Table 3 for the current and previous BM instances, i.e. p and p−1, the UE checks if it needs to adjust its current beam, to either maintain the connection to the serving gNB or to handover to one of the neighbors.

An algorithm proposal is provided below.

Find gNB that has max power at BM instance p: (k, p)=max($P_{avg}$(k,p), k∈{0, …, K}).

If (k, p)>%(0, p−1) then:

If k=0 then:

UE stays connected to the current serving cell;

UE checks if intra-cell beam handover is needed:

If similarity $((\theta, \phi), (\theta, \phi)_{0,p-1})$>threshold then best DoA is $(\theta, \phi)_{0,p}$ If k≠0 then:

UE needs to handover to neighbor gNB k;

Best DoA is $(\theta, \phi)$,

UE informs serving gNB that best gNB is gNB k, and reports the time offset (, p).

UE stores $(\theta, \phi)$, to be used for BA with the new serving cell,

To prevent unnecessary beam toggling the algorithm uses 2 control variables. z % is a control variable that prevents the UE changing the beam at any marginal power increase. $si((\theta, \phi)a, (\theta, \phi)b)$ is a hysteresis function that characterizes how much the DoA has changed. If the output of this function is above the threshold, then it indicates that the DoA has changed significantly and the UE needs to adjust the beam. One proposal is to use the Euclidian distance $si((\theta, \phi)a, (\theta, \phi)b) = \sqrt{(\theta a - \theta b)^2 + (\phi a - \phi b)^2}$ The used DSR radiation patterns should be optimized to have high gain in the sector covered by the specific antenna array. In theory, dividing the antenna array into two sub arrays (two DSR radiation patterns) will decrease the achievable antenna gain by 3 dB, dividing the array into 4 sub arrays will decrease the achievable antenna gain by 6 dB and so forth. However, since the CSI-RS from the gNB can be transmitted with full antenna gain (the gNB knows the location of the UE), the total link budget for the BM procedure is better or comparable with the 3GGP specified BM, where both the gNB and the UE can have reduced antenna gain in the first phase (P−1). The highest DSR antenna gain will be achieved by only using two DSR radiation patterns at any given time and then cycle between different sets of DSR patterns. This will increase the time needed to derive the DoA, but still be significantly faster that the current 3GGP BM procedure.

The UE will receive the CSI-RS in two orthogonal polarizations on the same radiation pattern to be able to determine its power and phase for any incoming polarization of the gNB CSI-RS.

DSR-IBM is reciprocal (see FIG. 9), i.e. the UEs in a sector transmit orthogonal DMRS/SRS in directions towards the gNB. The gNB receives the DMRS/SRS in a preconfigured antenna array setting and performs the procedure of signal validation and IBM as described above.

The DSR-IBM may be triggered by either or both of the UE and the gNB by using a PLI (Propagation Link Index) monitoring concept. If the DSR-IBM is UE controlled PLI monitoring may be periodic or based on local quality measurements that do not meet a threshold level. if the DRS-IBM is gNB controlled, a combination of periodic and local quality measurement thresholds may be used.

The beam switching decision may be controlled by both the UE or the gNB. The UE may decide by itself to change its beam, for example, if the DL link quality has degraded, and if the UE has detected a better beam. The gNB may instruct the UE to change its beam. The gNB and the UE may use PLI to get both downlink and uplink channel information for the decision process.

DSR-IBM may improve reliability since it reduces the risk of link-failure due to beam misalignment, since it will ensure that the gNB and the UE are using the correct beam-set.

The correct beam for the UE and gNB can easily be recalculated over time, and the procedure does not require any additional signaling. Furthermore, it bypasses the current time-expensive BM procedure (P-1, P-2 & P-3) where only one beam-set can be monitored at any given time.

Figure 22:
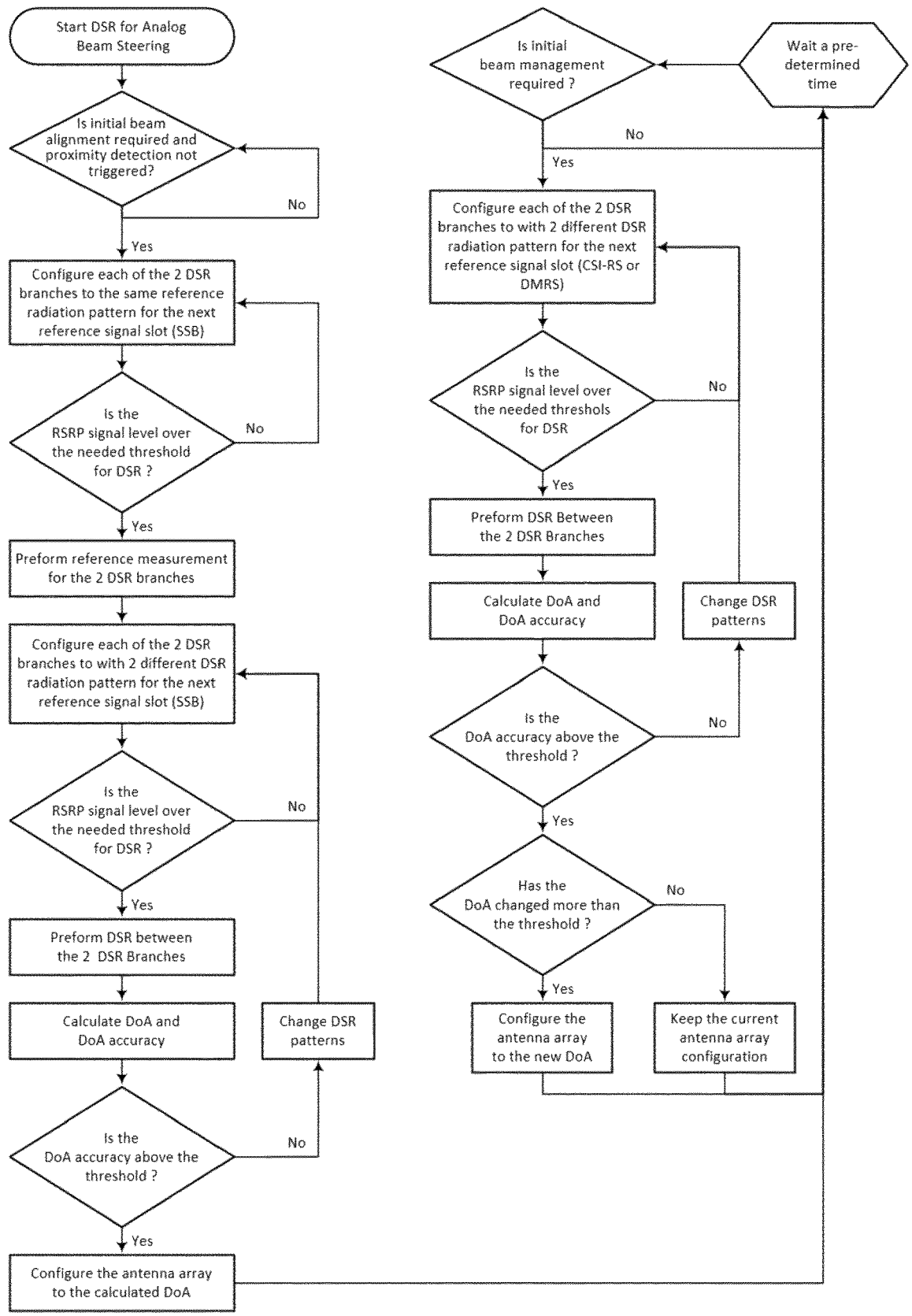
FIG. 22 shows a flowchart of a method according to an example embodiment.

FIG. 22 shows a flowchart for IBA-DSR with Hybrid and Digital Beam steering

Figure 23:
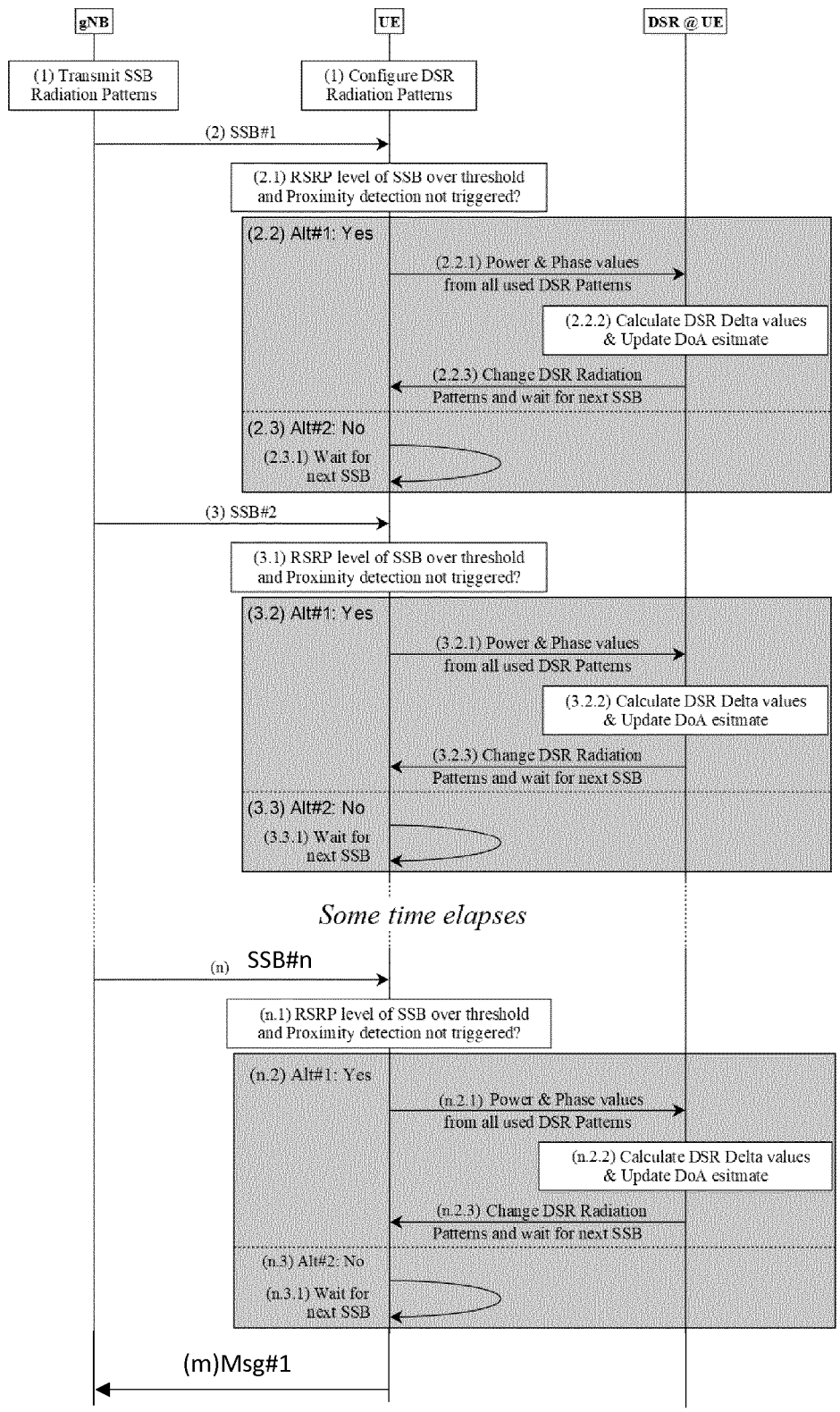
FIG. 23 shows a signalling flow according to an example embodiment.

FIG. 23 shows flowchart for IBM-DSR with Analog beam steering.

Figure 24:
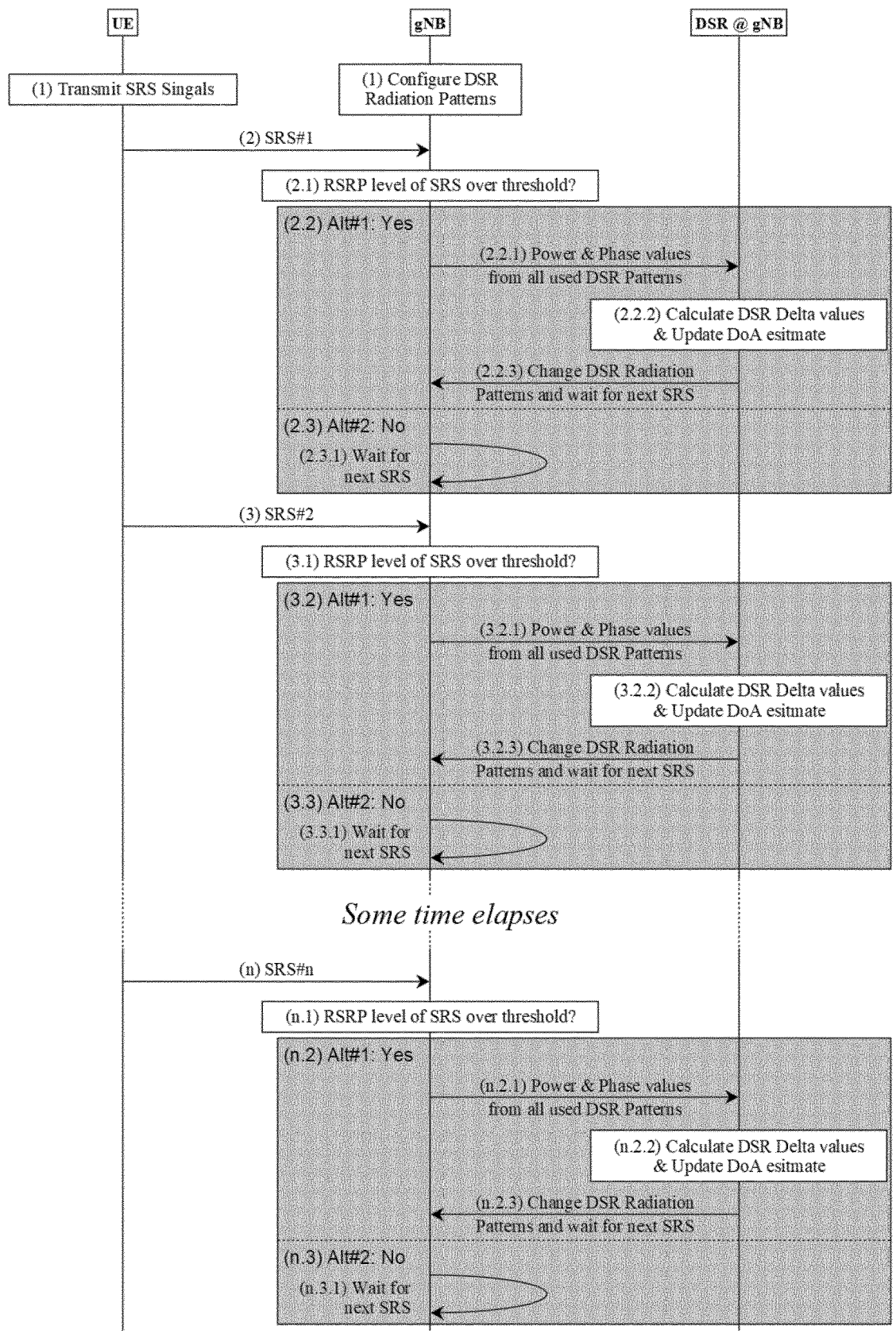
FIG. 24 shows a signalling flow according to an example embodiment.

FIG. 24 shows a signalling chart for DSR at a UE.

In a first step, the gNB is configured to transmit its SSB sequence and the UE is configured to enter DSR mode with one or more DSR radiation patterns depending of its RF Front-End capabilities. (In some examples the DSR radiation patterns will only have to be used when receiving an SSB signal (beam tracking) but can be used for receiving other signals from the gNB as well if no better radiation pattern is known (Initial Access)).

In a second step, the gNB transmit its first SSB #1.
Step 2.1: Is the received signal level (RSRP) of the SSB #1 over a predetermined threshold? (The UE may or may not receive the first transmitted SSB depending on the location of the UE relative to the gNB.)
Step 2.2: If Yes
Step 2.2.1: The UE measures the received power and phase of all used DSR radiation patterns
Step 2.2.2: Calculate and store new DSR Delta power and phase values. Estimate the Direction of Arrival together with the related probability based on the available measured DSR Delta values.
Step 2.2.3: Change the DSR radiation patterns and wait for the next SSB signal (The new set of DSR radiation patterns will only have to be used when receiving an SSB signal (beam tracking) but can be used for receiving other signals from the gNB as well if no better radiation pattern is known (Initial Access)).
Step 2.3: If No
Step 2.3.1: The UE waits for the next SSB signal
Step 3: The gNB transmit its second SSB #2.
Step 3.1=Step 2.1
Step 3.2=Step 2.2
Step 3.2.1=Step 2.2.1
Step 3.2.2=Step 2.2.2
Step 3.2.3=Step 2.2.3
Step 3.3=Step 2.3
Step 3.3.1=Step 2.3.1
Step n=Step 2

At step (m) (see bottom of FIG. 23), the UE transmits Msg #1 to the gNB at the correct time, when the gNB is again configured with the best SSB beam.

It will thus be understood that the UE can receive one or more SSB sweeps from the gNB, and will select the one with the best RSRP for time synchronization using the Primary Synchronization Signal (PSS) and the secondary Synchronization Signals SSS, which is part of the SSB message. The UE will also decode the Master Block Information (MIB), which will contain information on where and when the System Information Block1 is located, whereafter the UE will decode the SIB1. The SIB1 contains information of the SSB burst sequence, like ssb-PositionsInBurst and ssb-PeriodicityServingCell. In examples the UE will then decode the SIB2 to get information on when to transmit its RACH (Msg #1), and which format to use. In examples the gNB will configure different RACH groups with different beam directions, so the SIB2 information related to the best SSB beam seen from the UE will tell the UE when the gNB will be configured with a beam towards the UE.

FIG. 24 shows a signalling chart for DSR at the gNB.

In a first step, the UE is configured to transmit its SRS signal & the gNB is configured to enter DSR mode with one or more DSR radiation patterns depending of its RF Front-End capabilities. (The DSR radiation patterns will only have to be used when receiving an SRS signal (beam tracking) but can be used for receiving other signals from the UE as well if no better radiation pattern is known (Initial Access)).

In a second step, the UE transmits its first SRS #1.
Step 2.1: Is the received signal level (RSRP) of the SRS #1 over a predetermined threshold? (The gNB may or may not receive the first transmitted SRS depending on the location of the gNB relative to the UE.)
Step 2.2: If Yes
Step 2.2.1: The gNB measures the received power and phase of all used DSR radiation patterns
Step 2.2.2: Calculate and store new DSR Delta power and phase values. Estimate the Direction of Arrival together with the related probability based on the available measured DSR Delta values.
Step 2.2.3: Change the DSR radiation patterns and wait for the next SRS signal (The new set of DSR radiation patterns will only have to be used when receiving an SRS signal (beam tracking) but can be used for receiving other signals from the UE as well if no better radiation pattern is known (Initial Access)).
Step 2.3: If No
Step 2.3.1: The gNB waits for next SRS signal
Step 3: The gNB transmit its second SRS #2.
Step 3.1=Step 2.1
Step 3.2=Step 2.2
Step 3.2.1=Step 2.2.1
Step 3.2.2=Step 2.2.2
Step 3.2.3=Step 2.2.3
Step 3.3=Step 2.3
Step 3.3.1=Step 2.3.1
Step n=Step 2

The BA time can be significantly reduced if the IBA-DSR is implemented at the gNB and/or in the UE. The method may reduce the time needed to align the beams at the gNB and the UE. The method is Rel15 FR2 BA compliant and may enable BA on the fly, i.e., without cycling through the standard BA P1-P3 procedures. The method may be applicable to FR2 devices using the existing signalling procedure already defined for FR2. However, it is not limited to FR2 frequency and may also be used on a gNB.

The method is applicable for gNBs and UEs operating at all frequency ranges (where multiple antennas are used for beamforming).

The method is transparent to the current Rel 15. BA signaling and can be implemented at either/both gNB and UE.

The solution has low computational complexity and relies on operations performed in the analog domain: power/phase subtractions and table lookups.

The method may be implemented in a user equipment as described with reference to FIG. 2 or a control apparatus as described with reference to FIG. 3.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to . . . , similar principles can be applied in relation to other networks and communication systems . . . . Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. A method, comprising:
receiving at least one signal from at least one transmitter;
determining at least one parameter of the at least one signal;
determining, based on the at least one parameter, which of a plurality of stored differential signal reception radiation patterns the received signal corresponds to, the plurality of stored radiation patterns associated with a direction of arrival; and
aligning an antenna beam to the transmitter based on the direction of arrival associated with the determined stored differential signal reception radiation pattern.

2. The method according to claim 1, wherein the at least one signal is a reference signal.

3. The method according to claim 2, wherein the reference signal comprises one of a synchronization signal block, a demodulation reference signal, a channel state information reference signal, a specific beam alignment reference signal and a sounding reference signal.

4. The method according to claim 1, wherein the transmitter comprises one of a base station and a user equipment and the receiving is at an apparatus which comprises the other of the base station and the user equipment.

5. The method according to claim 4, wherein the method is performed at a user equipment and the method comprises receiving one or more synchronization signal block sweeps from the base station, and selecting the synchronization signal block sweep with the best reference signal received power for time synchronization using a primary synchronization signal and a secondary synchronization signal, which are part of the synchronization signal block.

6. The method according to claim 5, wherein the method comprises decoding of master block information to obtain burst sequence information of the one or more synchronization signal block sweeps.

7. The method according to claim 6, wherein the method comprises using decoded master block information to determine when the base station will next be configured with the synchronization signal block sweep with the best reference signal received power, and time transmission of the user equipment accordingly.

8. The method according to claim 1, comprising determining an identity of the transmitter.

9. The method according to claim 1, comprising determining that the power of the at least one signal is higher than a threshold value.

10. The method according to claim 1, comprising determining a parameter of the at least one signal by comparing at least one of a power and a phase of a first reception of the signal with the at least one of a power and a phase of a second reception of the signal.

11. The method according to claim 10, wherein the first reception of the signal is received at at least one first antenna radiation pattern and the second reception of the signal is received at at least one second antenna radiation pattern.

12. The method according to claim 1, comprising changing the differential signal reception pattern to obtain a more accurate direction of arrival.

13. The method according to claim 12, comprising changing the differential signal reception pattern by changing power and phase weights of an antenna.

14. The method according to claim 1, comprising monitoring the determined differential signal reception radiation pattern after a first time period, and changing the determined differential signal reception pattern when a quality threshold is not met.

15. The method according to claim 1, comprising performing at least one of digital, hybrid and analog beam steering.

16. The method according to claim 1, wherein each of the plurality of stored radiation patterns is associated with a respective direction of arrival.

17. A computer program embodied on a non-transitory computer-readable medium, said computer program comprising instructions for causing an apparatus to perform at least:
receiving at least one signal from at least one transmitter;
determining at least one parameter of the at least one signal;
determining, based on the at least one parameter, which of a plurality of stored differential signal reception radiation patterns the received signal corresponds to, the plurality of stored radiation patterns associated with a direction of arrival; and
aligning an antenna beam to the transmitter based on the direction of arrival associated with the determined stored differential signal reception radiation pattern.

18. An apparatus comprising:
at least one processor; and
at least one memory including computer program code;
the at least one memory and the computer program code configured to, with the at least one processor, cause the apparatus at least to:
receive at least one signal from at least one transmitter;
determine at least one parameter of the at least one signal;
determine, based on the at least one parameter, which of a plurality of stored differential signal reception radiation patterns the received signal corresponds to, the plurality of stored radiation patterns associated with a direction of arrival;
and align an antenna beam to the transmitter based on the direction of arrival associated with the determined stored differential signal reception radiation pattern.

19. The apparatus according to claim 18, wherein the at least one signal comprises a reference signal.

20. The apparatus according to claim 19, wherein the reference signal comprises one of a synchronization signal block, a demodulation reference signal, a channel state information reference signal, a specific beam alignment reference signal and a sounding reference signal.

21. The apparatus according to claim 18, wherein the transmitter comprises one of a base station and a user equipment and the apparatus comprises the other of the base station and the user equipment.

22. The apparatus according to claim 21, wherein the apparatus comprises a user equipment and the at least one memory and the computer program code are configured to, with the at least one processor, cause the apparatus at least to perform receiving one or more synchronization signal block sweeps from the base station, and select the synchronization signal block sweep with the best reference signal received power for time synchronization using a primary synchronization signal and a secondary synchronization signal, which are part of the synchronization signal block.

23. The apparatus according to claim 22, wherein the at least one memory and the computer program code are configured to, with the at least one processor, cause the apparatus at least to perform decoding of master block information to obtain burst sequence information of the one or more synchronization signal block sweeps.

24. The apparatus according to claim 23, wherein the at least one memory and the computer program code are configured to, with the at least one processor, cause the apparatus at least to perform using decoded master block information to determine when the base station will next be configured with the synchronization signal block sweep with the best reference signal received power, and time transmission of the user equipment accordingly.

25. The apparatus according to claim 18, wherein the at least one memory and the computer program code are configured to, with the at least one processor, cause the apparatus at least to determine an identity of the transmitter.

26. The apparatus according to claim 18, wherein the at least one memory and the computer program code are configured to, with the at least one processor, cause the apparatus at least to determine that the power of the at least one signal is higher than a threshold value.

27. The apparatus according to claim 18, wherein the at least one memory and the computer program code are configured to, with the at least one processor, cause the apparatus at least to determine a parameter of the at least one signal by comparing at least one of a power and a phase of a first reception of the signal with the at least one of a power and a phase of a second reception of the signal.

28. The apparatus according to claim 27, wherein the first reception of the signal is received at at least one first antenna radiation pattern and the second reception of the signal is received at at least one second antenna radiation pattern.

29. The apparatus according to claim 18, wherein the at least one memory and the computer program code are configured to, with the at least one processor, cause the apparatus at least to change the differential signal reception pattern to obtain a more accurate direction of arrival.

30. The apparatus according to claim 29, wherein the at least one memory and the computer program code are configured to, with the at least one processor, cause the apparatus at least to change the differential signal reception pattern by changing power and phase weights of an antenna of the apparatus.

31. The apparatus according to claim 18, wherein the at least one memory and the computer program code are configured to, with the at least one processor, cause the apparatus at least to monitor the determined differential signal reception radiation pattern after a first time period, and change the determined differential signal reception pattern when a quality threshold is not met.

32. The apparatus according to claim 18, wherein the at least one memory and the computer program code are configured to, with the at least one processor, cause the apparatus at least to perform at least one of digital, hybrid and analog beam steering.

33. The apparatus according to claim 18, wherein each of the plurality of stored radiation patterns is associated with a respective direction of arrival.

* * * * *